(12) United States Patent
Wood

(10) Patent No.: US 11,481,339 B2
(45) Date of Patent: Oct. 25, 2022

(54) TRUSTED INTERMEDIARY REALM

(71) Applicant: Arm Limited, Cambridge (GB)

(72) Inventor: Nicholas Wood, Belfast (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/267,941

(22) PCT Filed: Sep. 3, 2019

(86) PCT No.: PCT/GB2019/052447
§ 371 (c)(1),
(2) Date: Feb. 11, 2021

(87) PCT Pub. No.: WO2020/079388
PCT Pub. Date: Apr. 23, 2020

(65) Prior Publication Data
US 2021/0334222 A1    Oct. 28, 2021

(30) Foreign Application Priority Data
Oct. 19, 2018 (GB) ................................ 1817041

(51) Int. Cl.
G06F 12/14 (2006.01)
G06F 21/60 (2013.01)
G06F 21/79 (2013.01)

(52) U.S. Cl.
CPC ........ *G06F 12/1491* (2013.01); *G06F 12/145* (2013.01); *G06F 12/1441* (2013.01);
(Continued)

(58) Field of Classification Search
None
See application file for complete search history.

(56) References Cited

U.S. PATENT DOCUMENTS 7,287,140 B1    10/2007  Asanovic et al.
10,587,411 B2 *  3/2020  Kraemer .................. G09C 1/00
(Continued)

FOREIGN PATENT DOCUMENTS

GB    2539435    12/2016
GB    2563889    1/2019

OTHER PUBLICATIONS

Robert Bedichek, "Some Efficient Architecture Simulation Techniques," Proceedings of the Winter 1990 USENIX Conference, Jan. 22-26, 1990, 12 pages.
(Continued)

*Primary Examiner* — Yaima Rigol
(74) *Attorney, Agent, or Firm* — Nixon & Vanderhye P.C.

(57) ABSTRACT

Memory access circuitry controls access to memory based on ownership information defining, for a given memory region, an owner realm specified from among two or more realms, each realm corresponding to at least a portion of a software processes running on processing circuitry. The owner realm has a right to exclude other realms from accessing data stored within the given memory region. When security configuration parameters for a given realm specify that the given realm is associated with a trusted intermediary realm identified by the security configuration parameters, the trusted intermediary realm may be allowed to perform at least one realm management function for the given realm, e.g. provision of secret keys and/or saving/restoring of security configuration parameters. This can enable use cases where multiple instances of the same realm with common parameters need to be established on the same system at different times or on different systems.

18 Claims, 22 Drawing Sheets

(52) U.S. Cl.
CPC ............ *G06F 21/602* (2013.01); *G06F 21/79* (2013.01); *G06F 2221/0751* (2013.01)

(56) References Cited

U.S. PATENT DOCUMENTS

| | | | |
|---|---|---|---|
| 2008/0077922 A1* | 3/2008 | Doring | G06F 21/79 |
| | | | 718/100 |
| 2010/0318800 A1* | 12/2010 | Simon | H04L 9/0869 |
| | | | 713/171 |
| 2016/0246720 A1* | 8/2016 | Pandey | G06F 12/14 |
| 2017/0010982 A1 | 1/2017 | Avanzi et al. | |
| 2018/0173645 A1 | 6/2018 | Parker et al. | |

OTHER PUBLICATIONS

Jakub Szefer, et al., "Architectural Support for Hypervisor-Secure Virtualization", ACM SIGARCH Computer Architecture News, Apr. 18, 2012, pp. 437-449 (13 pages).
Combined Search and Examination Report for GB Application No. 1817041.5 dated Apr. 30, 2019, 7 pages.
International Search Report and Written Opinion of the ISA for PCT/GB2019/052447 dated Oct. 16, 2019, 16 pages.

* cited by examiner

| Field | Description |
|---|---|
| gRID | gRID of this Realm. |
| State | Life cycle state. |
| Type | Realm type. |
| BEL | Boundary Exception level. |
| Resource count | Total number of RPGs owned by the Realm and all of its descendants. |
| Protected address start | Start of protected address range. |
| Protected address end | End of protected address range. |
| Memory key | Used to encrypt contents of memory owned by the Realm. |
| Paging key | Used to encrypt data which is paged out from memory to persistent storage. |
| RDTE | Realm Descriptor Tree Entry, root of Realm Descriptor Tree. |
| REC pointer | Pointer to the primary REC of the Realm. |

| State | Parameters modifiable | Valid encryption keys | Can own RPGs | Executable |
|---|---|---|---|---|
| *Clean* | Yes | No | No | No |
| *New* | No | Yes | Yes | No |
| *Active* | No | Yes | Yes | Yes |
| *Invalid* | No | Yes | Yes | No |

FIG. 10

| Property | Description |
|---|---|
| Owner Realm | Owner of this RPG. |
| State | Life cycle state of this RPG. |
| Mapped address | RBA at which the RPG was mapped at the point it became owned by the Realm. |
| Visibility | Which Realms, in addition to the owner, can access the RPG. |

| Parent visibility bit | Global visibility bit | Resulting RPG visibility |
|---|---|---|
| 0 | 0 | *Owner* |
| 0 | 1 | *Invalid* |
| 1 | 0 | *Parent* |
| 1 | 1 | *Global* |

FIG. 13

| | State | Accessible to software | Reserved for RMU | In use by RMU |
|---|---|---|---|---|
| | *Invalid* | No | No | No |
| | *Valid* | Yes | No | No |
| RMU-private | *RMUClean* | No | Yes | No |
| | *RMURegistered* | No | Yes | Yes |
| | *RMUExporting* | No | Yes | Yes |
| | *RMUImporting* | No | Yes | Yes |

FIG. 14

TRUSTED INTERMEDIARY REALM

This application is the U.S. national phase of International Application No. PCT/GB2019/052447 filed Sep. 3, 2019 which designated the U.S. and claims priority to GB Patent Application No. 1817041.5 filed Oct. 19, 2018, the entire contents of each of which are hereby incorporated by reference.

The present technique relates to the field of data processing.

It is known to provide memory access control techniques for enforcing access rights for particular memory regions in a memory address space. Typically these may be based on privilege level, so that a process executing at a higher privilege level can exclude less privileged processes from accessing memory regions.

At least some examples provide an apparatus comprising: processing circuitry to perform data processing in response to one or more software processes; and memory access circuitry to control access to a plurality of memory regions based on ownership information defining, for a given memory region, an owner realm specified from among a plurality of realms, each realm corresponding to at least a portion of at least one of the software processes, said owner realm having a right to exclude other realms from accessing data stored within said given memory region; and a realm management unit to control operation of a given realm based on security configuration parameters associated with the given realm; in which: when the security configuration parameters for the given realm specify that the given realm is associated with a trusted intermediary realm identified by the security configuration parameters, the realm management unit is configured to permit the trusted intermediary realm to perform at least one realm management function for the given realm.

At least some examples provide a data processing method comprising: performing data processing in response to one or more software processes; and enforcing ownership rights for a plurality of memory regions based on ownership information defining, for a given memory region, an owner realm specified from among a plurality of realms, each realm corresponding to at least a portion of at least one of the software processes, said owner realm having a right to exclude other realms from accessing data stored within said given memory region; and controlling operation of a given realm based on security configuration parameters associated with the given realm; in which: when the security configuration parameters for the given realm specify that the given realm is associated with a trusted intermediary realm identified by the security configuration parameters, the trusted intermediary realm is permitted to perform at least one realm management function for the given realm.

At least some examples provide a computer program for controlling a host data processing apparatus to provide an instruction execution environment, comprising: memory access program logic to control access to a plurality of memory regions of a simulated memory address space based on ownership information defining, for a given memory region, an owner realm specified from among a plurality of realms, each realm corresponding to at least a portion of at least one of a plurality of software processes executed in the instruction execution environment, said owner realm having a right to exclude other realms from accessing data stored within said given memory region; and realm management program logic to control operation of a given realm based on security configuration parameters associated with the given realm; in which: when the security configuration parameters for the given realm specify that the given realm is associated with a trusted intermediary realm identified by the security configuration parameters, the realm management program logic is configured to permit the trusted intermediary realm to perform at least one realm management function for the given realm.

A storage medium may store the computer program. The storage medium may be non-transitory storage medium.

Further aspects, features and advantages of the present technique will be apparent from the following description of examples, which is to be read in conjunction with the accompanying drawings, in which:

FIG. 1 schematically illustrates a data processing system including a plurality of processing elements utilising memory regions stored within a first memory and a second memory;

FIG. 2 schematically illustrates a relationship between a plurality of processes executed, privilege levels associated with those processes, and realms associated with those processes for controlling which process owns a given memory region and accordingly has exclusive rights to control access to that given memory region;

FIG. 3 schematically illustrates memory regions under management by a realm management unit and a memory management unit;

FIG. 9 shows an example of contents of a realm descriptor;

FIG. 10 is a table illustrating different realm lifecycle states;

FIG. 12 is a table showing contents of an entry in an ownership table for a given memory region;

FIG. 13 is a table showing visibility attributes which can be set for a given memory region to control which realms other than the owner are allowed to access the region;

FIG. 14 shows an example of different lifecycle states for a memory region, including states corresponding to RMU-private memory regions which are reserved for exclusive access by the realm management unit;

Figure 17A:
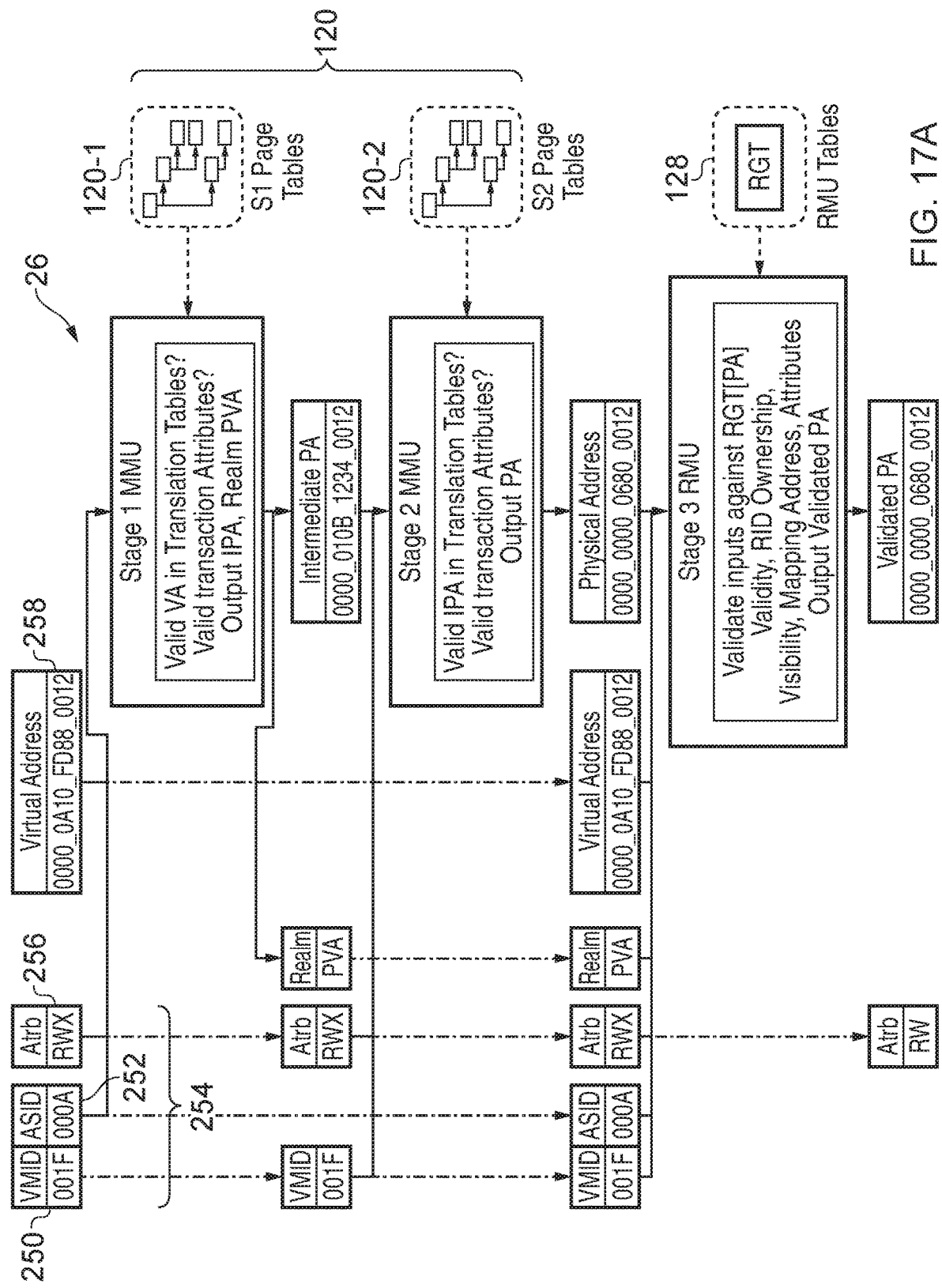
Figure 17B:
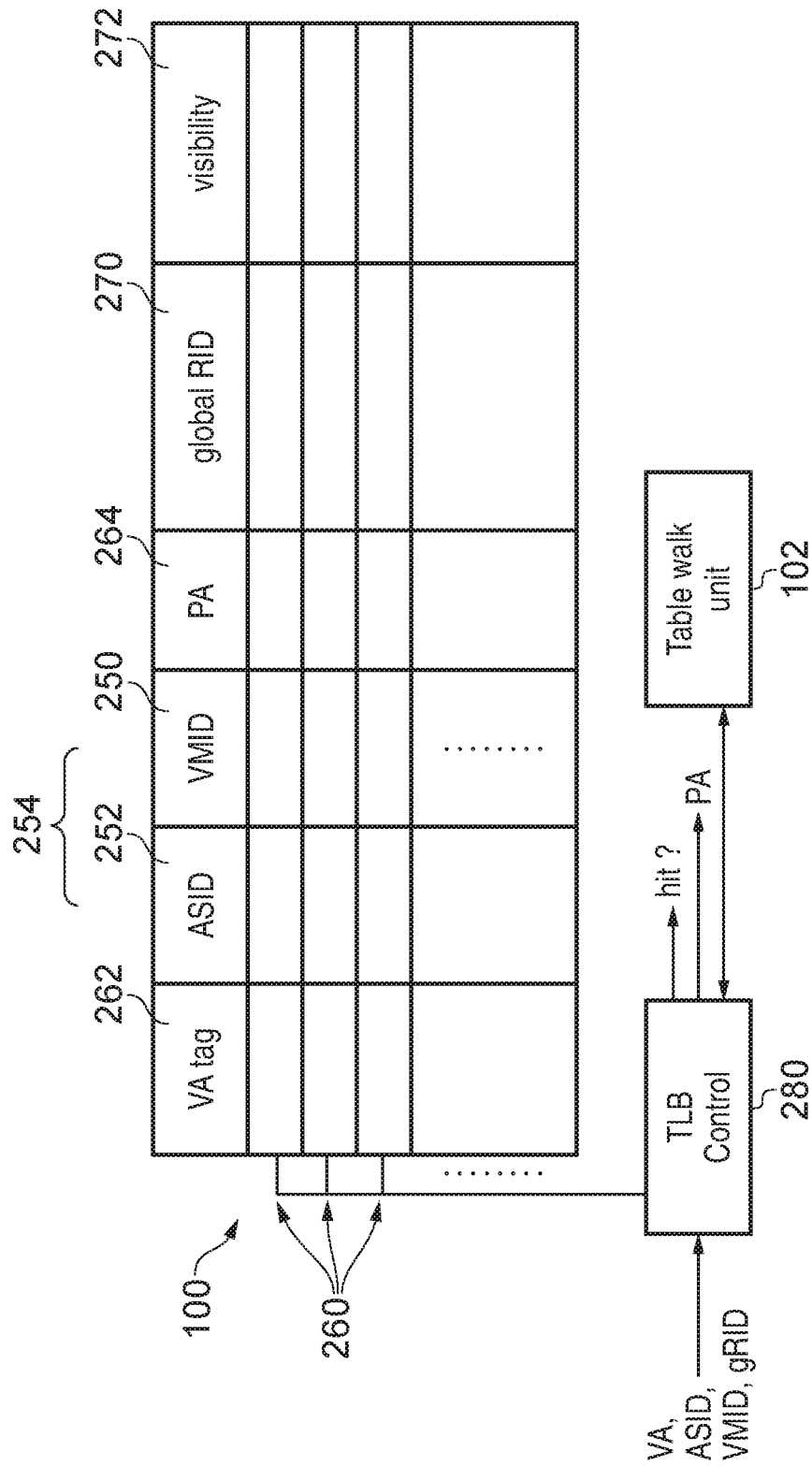
Figure 18:
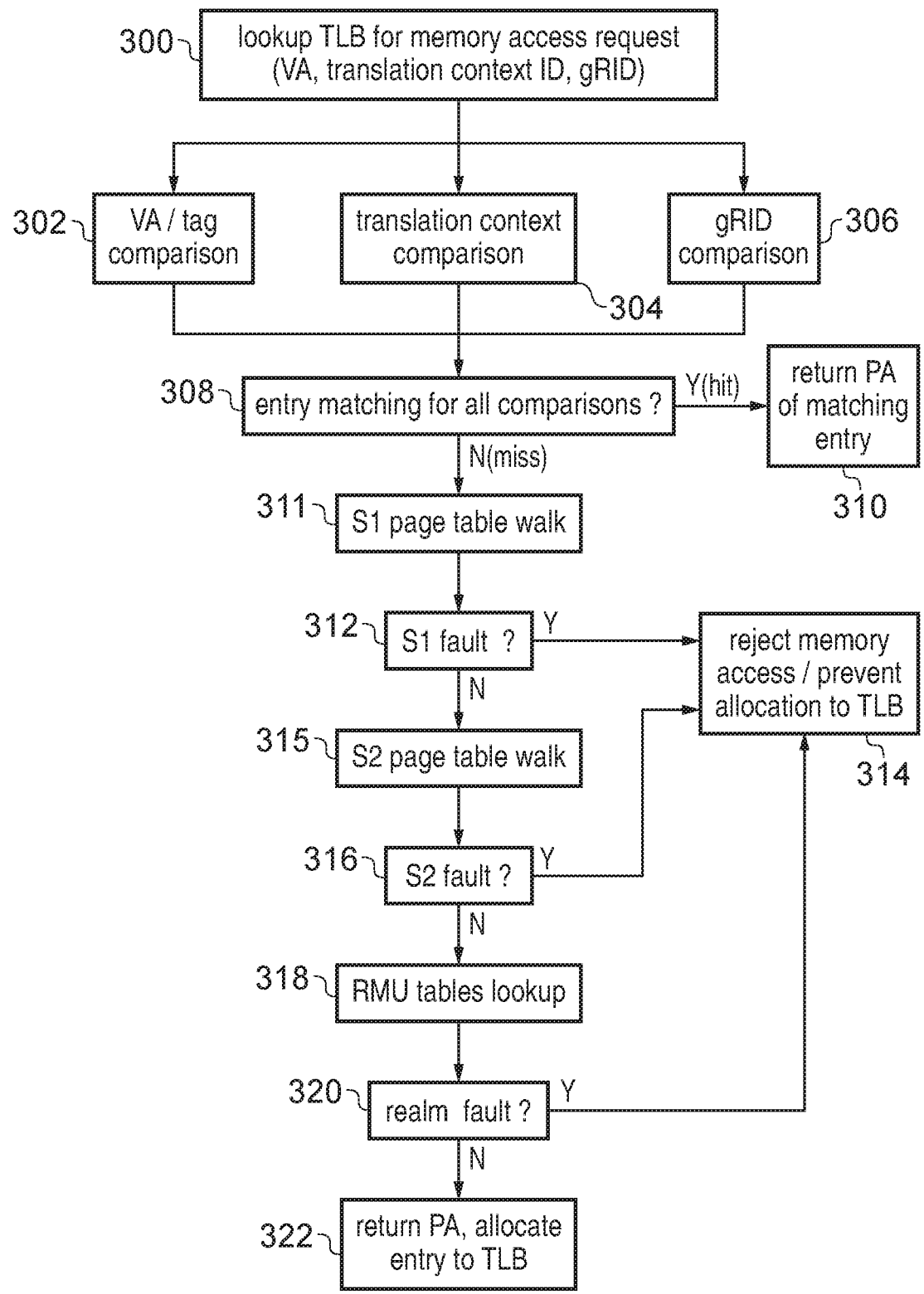
Figure 19:
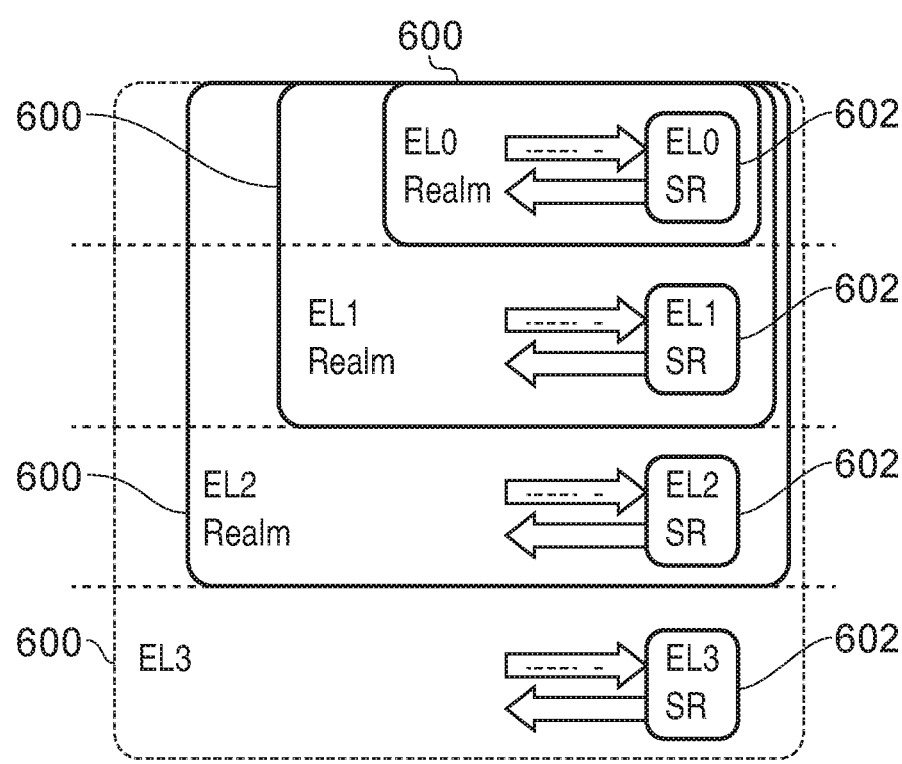
Figure 20:
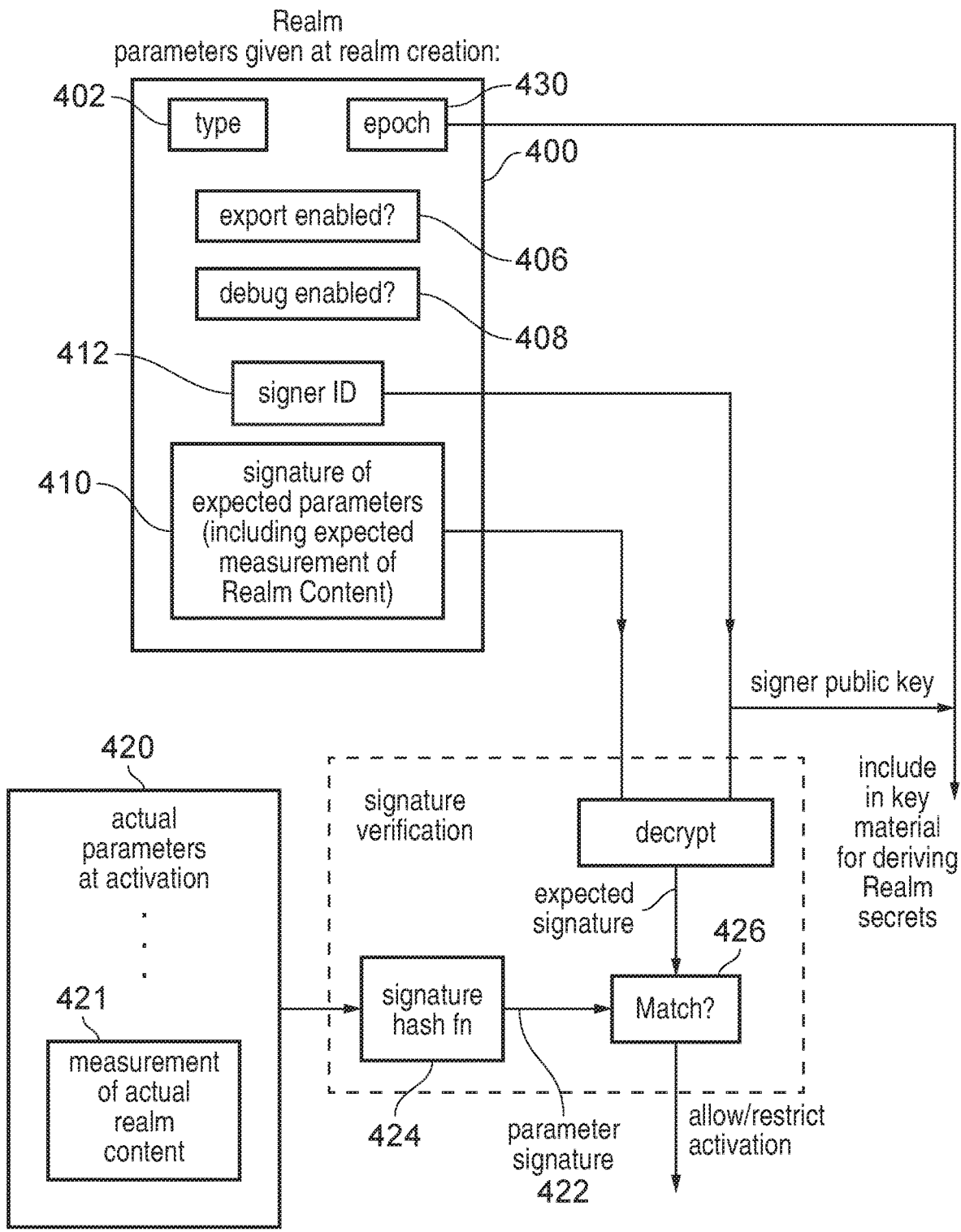
Figure 21:
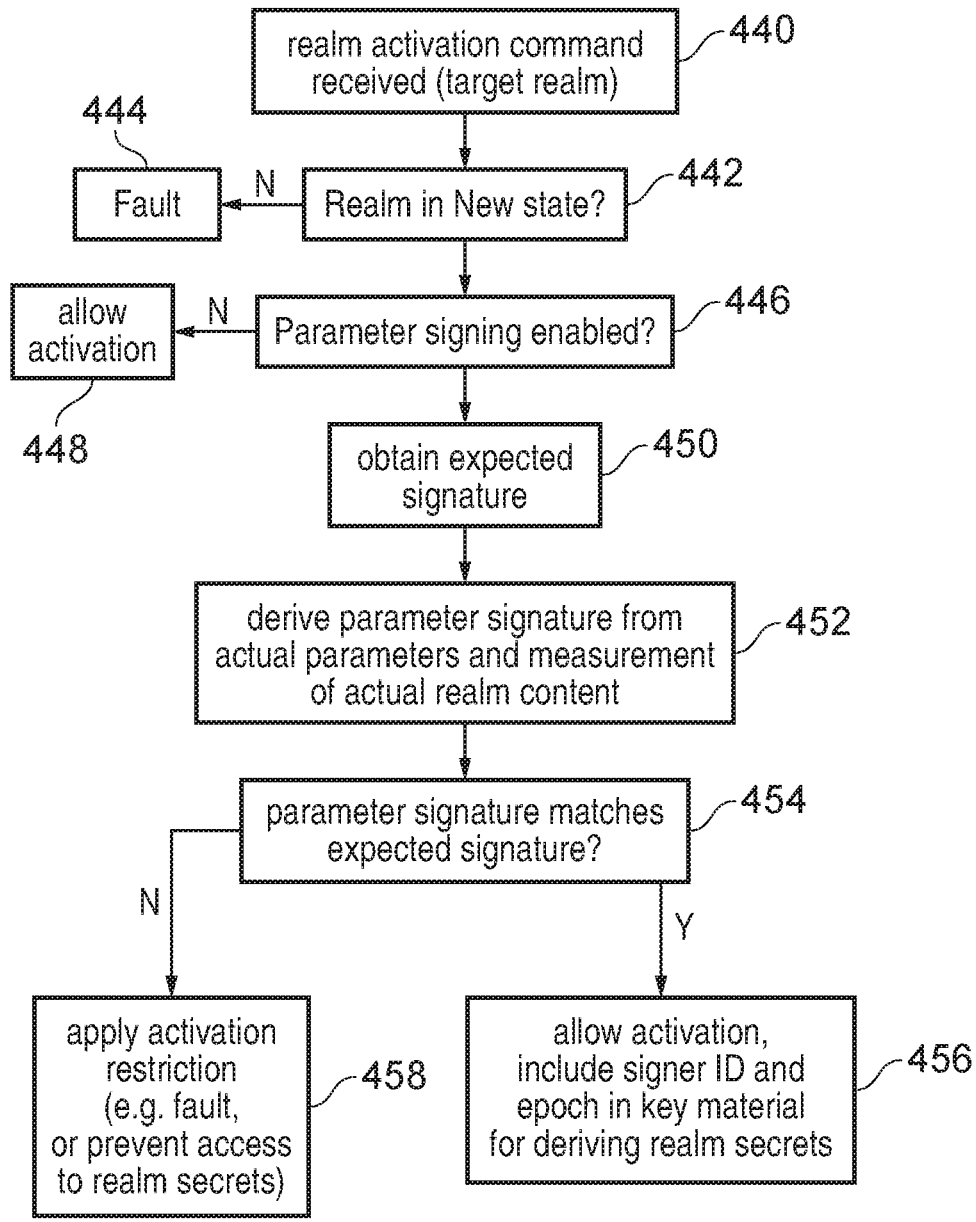
Figure 22:
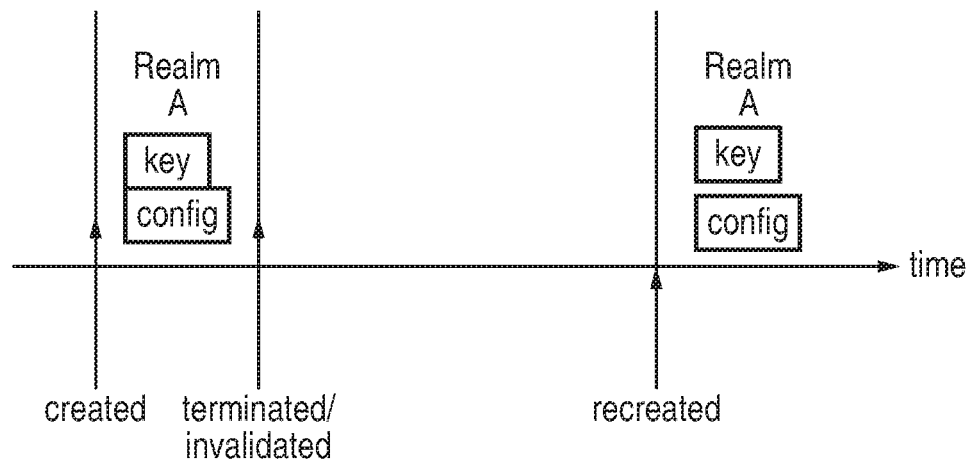
Figure 23:
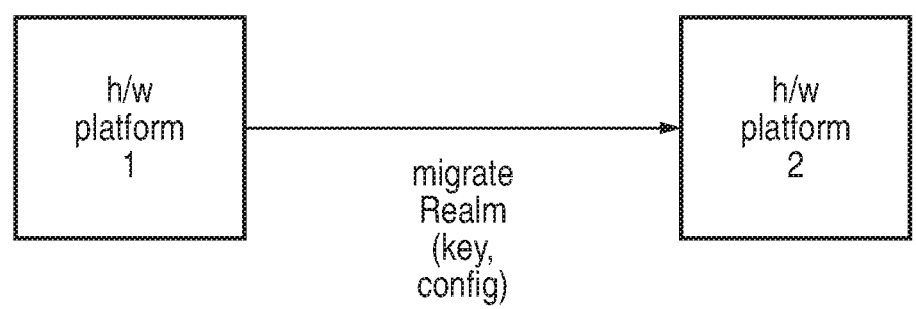
Figure 24:
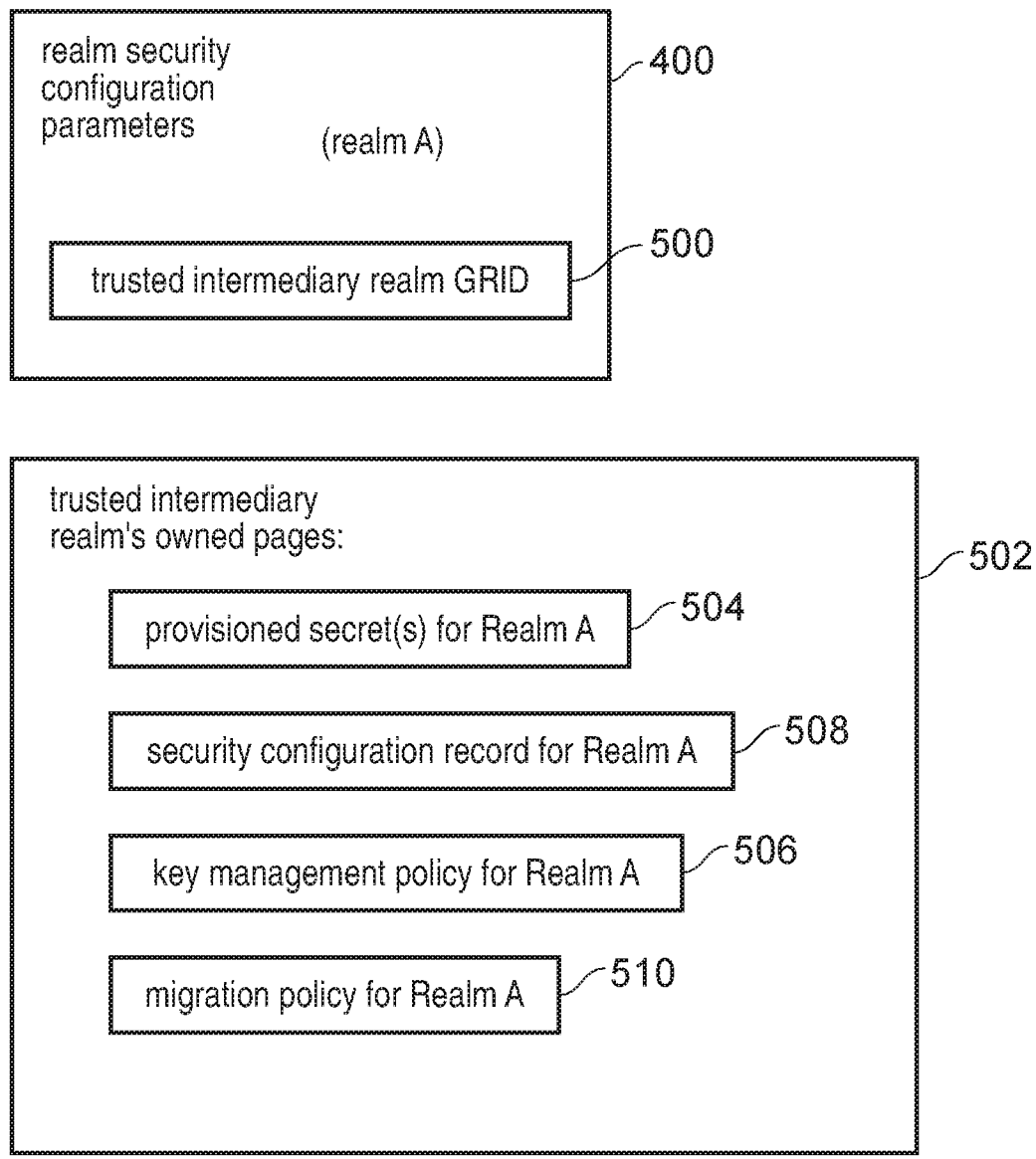
Figure 25:
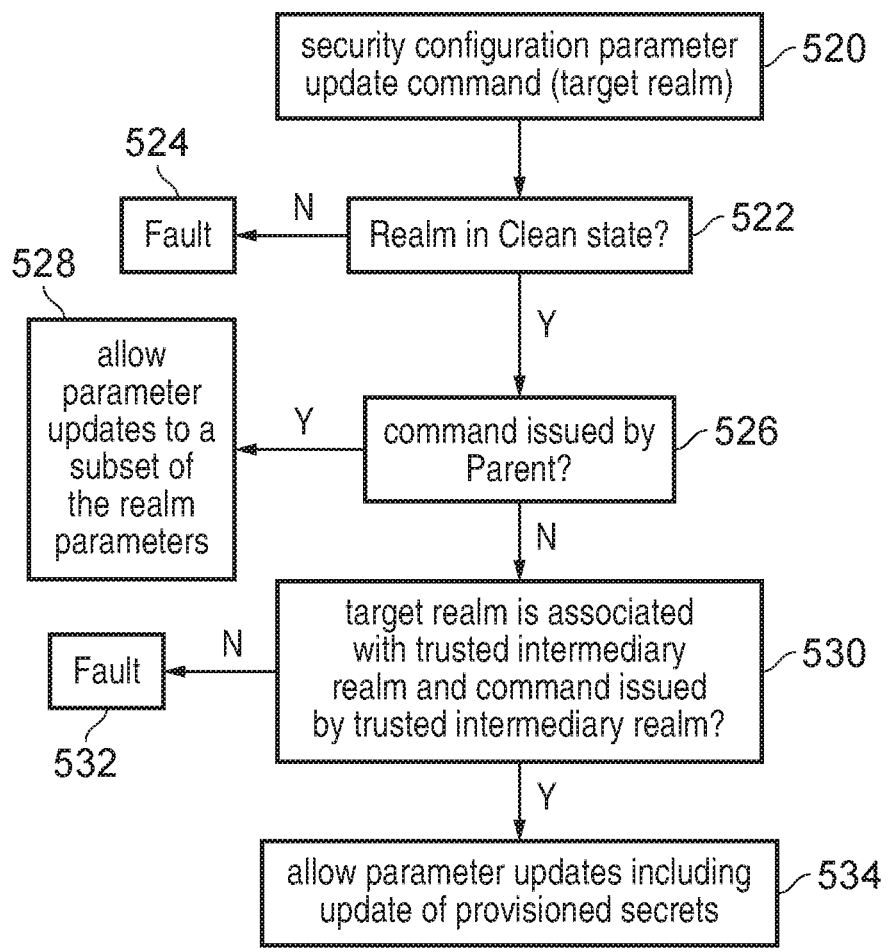
Figure 26:
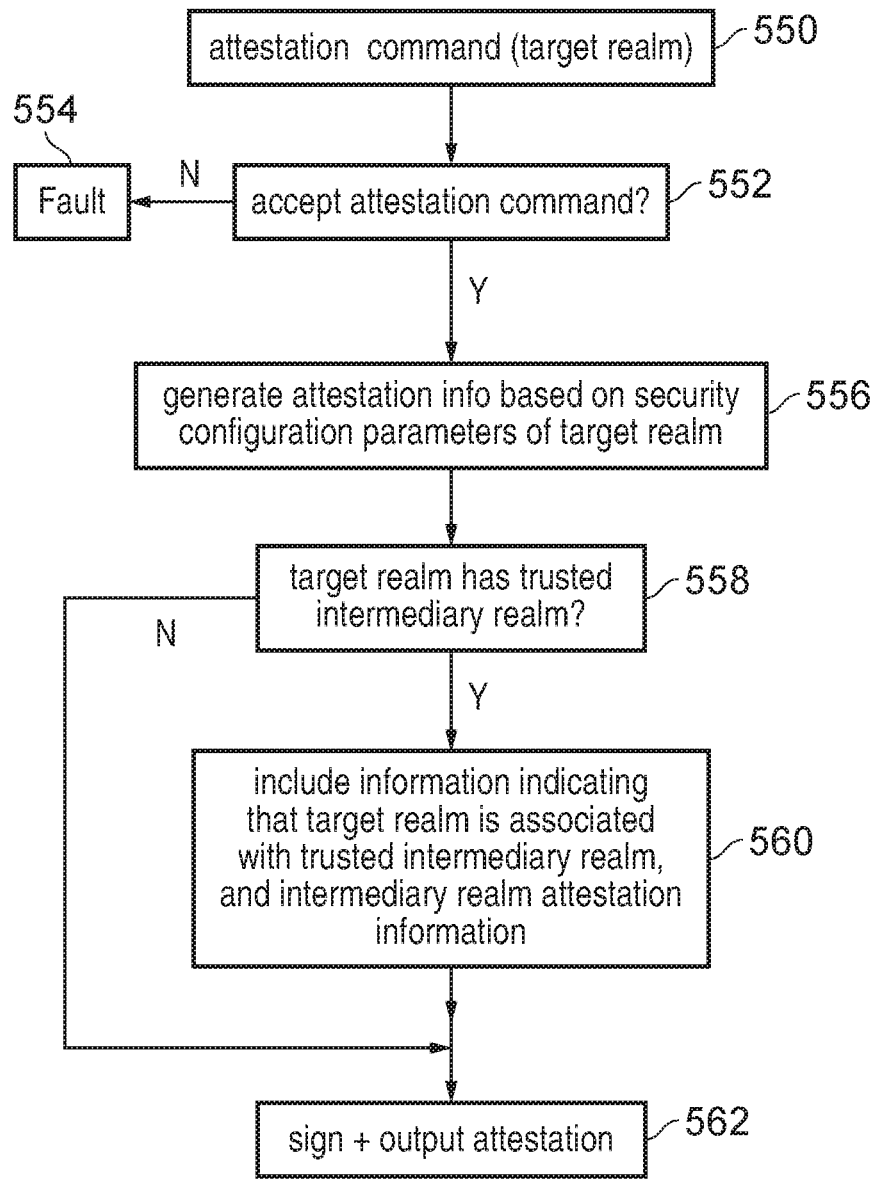

FIG. 17A schematically illustrates memory access control provided based on page tables which define memory control attributes which depend on privilege level and realm management unit levels which provide an orthogonal level of control over memory access based on the permissions set by an owner realm;

FIG. 17B illustrates an example of a translation lookaside buffer;

FIG. 18 is a flow diagram illustrating a method of controlling access to memory based on the page tables and RMU tables;

FIG. 19 illustrates the use of sub-realms which correspond to a specific address range within a process associated with the parent realm of the sub-realm;

FIG. 20 shows an example of parameter signing;

FIG. 21 shows a method of restricting activation of a realm when the parameter signature does not match an expected signature;

FIGS. 22 and 23 show two examples of use cases where it can be useful to start a realm with the same keys or security configuration as used by another realm;

FIG. 24 shows an example where a realm may be associated with a trusted intermediary realm;

FIG. 25 shows an example method of controlling realm management functions for a target realm using the intermediary realm;

FIG. 26 shows a method of generating an attestation for a target realm; and

Figure 27:
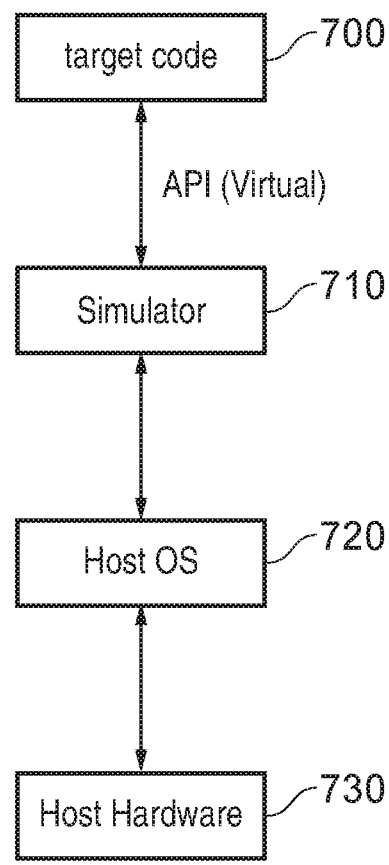

FIG. 27 illustrates a simulator example that may be used.

In a privilege-based memory access control scheme, a more privileged process can set access permissions defining which memory regions a less privileged process can access. However, this may generally imply that any region accessible to the less privileged process is also accessible to the more privileged process. Hence, all applications running under a given operating system or virtual machine may need to trust the software associated with the operating system or virtual machine, and all operating systems or virtual machines running under a given hypervisor may need to trust the hypervisor.

In some use cases, this trust of more privileged processes may not be desirable. For example in a data centre, a number of virtual machines may be provided by a number of different parties, each running under control of a hypervisor provided by the cloud platform provider who manages the data centre. The provider of a given virtual machine (or application running under a given virtual machine) may not wish to expose its data to the hypervisor or to other virtual machines, for example. For example, a banking provider could provide a virtual machine for running banking applications, and may not wish sensitive financial information to be accessible to the hypervisor or to other virtual machines sharing the same physical platform.

An apparatus may have processing circuitry to support processing of one or more software processes (such as applications, operating systems/virtual machines, hypervisor, etc.). Memory access circuitry may be provided to control access to a number of memory regions of a memory address space based on ownership information which defines, for a given memory region, an owner realm specified from among a plurality of realms. Each realm corresponds to at least a portion of at least one of the software processes. The owner realm for a given memory region has the right to exclude other realms from accessing data stored within the given memory region. Hence, in contrast to a privilege-based model where the access permissions merely define which processes are allowed to access (read or write) a given memory region, with the realm-based approach, the owner realm has the ability to control which other realms access its owned memory regions. Hence, there is a distributed control of memory access, where different parts of the address space can be allocated different realm owners who have control over access to that part of the address space, rather than the typical privilege-based model where a single process defines top-down rules for access to the address space by less privileged processes. This approach enables a given realm to protect its data from access by other processes including processes operating at the same privilege level or at higher privilege levels.

In some examples, this realm-based approach may be applied in parallel with a privilege-based memory protection model, so that there are multiple overlapping sets of access rights for a given memory region: the privilege-based permissions set by a higher-privilege process, and the access permissions set by the owner realm of the corresponding memory region. A memory access may be allowed if it satisfies both sets of permissions.

A realm management unit may be provided to control operation of a given realm based on security configuration parameters associated with the given realm. For example the security configuration parameters could define information such as a realm type (which may govern what properties the realm has or what operations the realm is able to carry out), a protected address range associated with the given realm (which may mark the bounds of the memory regions which can securely be accessed by the given realm), and other information about whether operation such as debugging or export of data from a memory protector using the memory access circuitry to an external memory outside the bounds of protection by the memory access circuitry would be permitted. Also the security configuration parameters could for example include key material for deriving at least one secret key for protecting data associated with a given realm. It will be appreciated that a variety of different security configuration parameters could be defined for a realm.

In the techniques discussed below, the security configuration parameters for a given realm may specify that the given realm is associated with a trusted intermediary realm identified by the security configuration parameters. The realm management unit may permit the trusted intermediary realm to perform at least one realm management function for the given realm. The provision of such trusted intermediary realm can be useful for enabling a number of use cases where separate instances of the same realm need to be set up, e.g. at different points in time and/or on different physical platforms, with each instance of the same realm needing access to some common configuration parameters to enable the realm to behave predictably regardless of the particular instance of the realm being established. It can be difficult for such shared configuration parameters to be established in a repeatable manner by the given realm itself, or by the hardware platform, while still maintaining security and trust. By defining a trusted intermediary realm which is allowed to perform certain realm management functions for the given realm, this can enable use cases such as secure migration of a realm from one platform to another, or the provision of common secret keys to multiple instances of the same realm running on the same system on different physical systems for load balancing or redundancy purposes. As the trusted intermediary realm is itself a realm which has its own ownership protections provided by the memory access circuitry, this means that the security of the trusted intermediary realm itself can be verified and attested to, to provide trust that the realm managed by the trusted intermediary realm is secure.

The realm management function may comprise updating at least a portion of the security configuration parameters for the given realm. In some cases, this ability to update the security configuration parameters may be restricted to certain stages in the realm life cycle, for example before activation of the given realm. A realm may not be allowed to be processed by the processing circuitry until it has been activated.

By providing a trusted intermediary realm which can manage updating of certain security configuration parameters, this makes it simpler to migrate realms between platforms or to save or restore previous versions of realms or initiate multiple instances of the same realm with a common security configuration.

In one example, each realm other than a root realm may be associated with a corresponding parent realm which created the realm. The realm management unit may support the security configuration parameters defining the trusted intermediary realm as a realm other than the parent realm of the given realm. That is, although the trusted intermediary realm could be defined as the parent realm if desired, the architecture also permits the trusted intermediary realm to be defined as a realm other than the parent realm.

Hence while the parent realm may initially create the realm, sometimes the parent realm itself may not be trusted to be aware of certain security configuration parameters for the given realm, such as key material for deriving secret keys for protecting data to be used by the realm. By enabling a realm other than the parent realm to establish certain security configuration parameters for a target realm managed by the intermediary, this can enable greater security in cases multiple realms need to have the same security configuration. For example, the trusted intermediary realm could be a realm operated based on software provided by a banking provider, healthcare provider or other party which intends the managed realm to have access to certain sensitive information, while the parent realm could be a hypervisor running on a cloud platform which may not be trusted by the banking/healthcare provider, etc.

The realm management unit may set whether the given realm is associated with the trusted intermediary, based on at least one command issued by the parent realm during creation of the given realm. Hence, both the parent realm and the trusted intermediary realm may at certain stages of the lifecycle of a given realm have the ability to set certain security configuration parameters. As mentioned below, a parameter signing scheme may be used to attest to whether the security configuration parameters have been set correctly for a given realm before it is activated. This can be used to check that the parent realm correctly configured the trusted intermediary realm during the realm's creation so that the party which needs to ensure that the realm has certain security configuration settings as defined by the trusted intermediary realm can check that the correct trusted intermediary realm is involved. This can protect against a malicious parent realm incorrectly setting the identification of the trusted intermediary realm for a given realm.

The realm management unit may support an attestation function, in which in response to an attestation command identifying a target realm, the realm management unit may provide an attestation attesting to properties of the target realm. For example the attestation may include information derived from the configuration parameters of the target realm and/or contents of the memory regions owned by the target realm. The attestation could be signed with a certain key attesting to its authenticity.

For realms for which the security configuration parameters specify that the target realm is associated with the trusted intermediary realm, the attestation may comprise information indicating the fact that the target realm is associated with the trusted intermediary realm. Also, the attestation may include intermediary realm attestation information, which is either information attesting to properties of the trusted intermediary realm directly, or information which enables a recipient of the attestation to request a further attestation of the trusted intermediary realm that was associated with the target realm. For example the intermediary realm attestation information could simply be an identifier of the trusted intermediary realm and then a subsequent attestation command could be issued identifying the trusted intermediary realm as a target realm so that a further attestation is generated for that trusted intermediary realm. Hence in general the realm management unit when attesting a given realm can also provide information enabling the validated entity to also attest to the associated trusted intermediary realm, so that they can establish trust in the fact that the realm was correctly configured by the trusted intermediary realm.

The realm management unit may prevent a given realm being processed by the processing circuitry until the given realm has been activated. The trusted intermediary realm associated with a given realm may be permitted to trigger generation of an attestation for the given realm before the given realm has been activated. This can be useful for the trusted intermediary realm to verify that security configuration parameters for the given realm have been correctly configured before providing a secret key or other configuration information to the realm. This can improve security. In contrast, if the attestation command is issued by a realm other than the trusted intermediary realm associated with the target realm, the attestation command could be rejected if the target realm is not in the active state.

In one example, the realm management function provided by the trusted intermediary realm may be the provision of at least one provisioned secret for the given realm. The provisioned secret may include at least one secret key for protecting data (including data values and/or program code) associated with a given realm; and/or key material for deriving such a secret key. Hence, by defining a trusted intermediary realm which can be trusted to provide provisioned secrets which can be used to protect the contents of another realm's owned memory regions, this enables multiple instances of the same realm to be set up on the same or different physical platforms or at different instances in time in a secured manner. The realm management unit may prohibit any realm other than the trusted intermediary realm from providing such provisioned secrets for the given realm.

The provision of the at least one provisioned secret for the given realm may be restricted to before the given realm has been activated. The trusted intermediary realm may be prohibited from providing such provisioned secrets for the given realm after the given realm has been activated. This can be useful to improve security because certain checks may be performed on activation of a given realm and this ensures that the provisioned secret can be verified before the realm is activated to enable it to be processed. The management of provision of the at least one provision secret may be based on key management policy information which may be provided by the trusted intermediary realm. For example, the key management policy could specify how many other realms can be provided with a given secret by the trusted intermediary realm, a time period within which a given version of the secret can be provided to realms managed by the trusted intermediary realm, or other conditions which are to be verified by the trusted intermediary realm as being satisfied for a managed realm before the secret can be provided to the managed realm, etc. This policy could itself be attested to by attesting the properties of the trusted intermediary realm using the attestation mechanism discussed above.

The at least one provisioned secret may not be the only type of secret key used by the given realm. There could also be other types of secrets, such as "instance unique" secrets which are derived from properties of a particular physical instance of hardware. Such secrets may remain the same if a given realm is executed on a particular platform and then later restarted on the same platform, but may be different if a realm is restarted on a different platform. Instance unique secrets can be derived securely without the operation of the trusted intermediary realm and they may for example be derived using hardware devices of the physical platform while operating inside a given realm. Another type of secret can be "realm unique" root secrets which may be generated for example using a pseudorandom number generator accessed by the software of the given realm itself and may be different each time a realm is restarted, even if restarted in the same system.

However, such instance unique or realm unique root secrets may not be appropriate in cases where a realm needs to be migrated to a different physical platform, or if multiple instances of the same realm need to be created, where different instances of the same realm need access to common secrets so that they can all access the same data securely. The provision of the trusted intermediary realm to manage the provision of the at least one provision secret as discussed above helps to address this problem.

In another example, the realm management unit may permit the trusted intermediary realm to record a security configuration record which is indicative of at least a subset of the security configuration parameters associated with the given realm. Normally, realms other than the given realm itself may not be allowed to access its security configuration parameters. In some implementations, only the realm management unit may be allowed to read the security configuration parameters of a given realm (even the given realm itself may not be allowed to read them). However by defining a specific trusted intermediary realm in the given realm's security configuration parameters, and permitting the trusted intermediary realm to record an indication of certain security configuration parameters, this can enable migration and saving/restoring of realms.

For example the realm management unit may permit the trusted intermediary realm to update at least a subset of the security configuration parameters associated with the given realm based on a security configuration record previously recorded by the trusted intermediary realm. Hence, if a realm needs to be migrated from one physical platform to another, the trusted intermediary realm may be set up to operate on both the source and destination platforms and then the trusted intermediary realm may record the security configuration record associated with a given realm on the source platform, encrypt the security configuration record using its own secret keys, and transmit the encrypted data to the corresponding instance of the trusted intermediary realm on the destination platform, which may then decrypt and restore those security configuration parameters from the security configuration record. This enables secrets or configuration information associated with a given realm to survive across migration, while maintaining security. Another example use may be for a realm to be terminated if processing resource needs to be made available for other purposes, and then for the same realm later to be recreated while still having access to common secrets. Also, a similar method can support related use cases such as backing up and then restoring a complete realm, or taking snapshots or checkpoints of a realm allowing it later to be rolled back to a previous known state. Hence the use of the trusted intermediary realm enables a number of operations which may not otherwise be possible securely.

The management of the recording of the security configuration record and/or the restoration of the security configuration parameters from the security configuration record may be based on policy information provided by the trusted intermediary realm. Again this policy can itself be attested by attesting the trusted intermediary.

The security configuration parameters for the given realm may include at least one of: a realm type; a protected address range associated with the given realm; an indication of whether debugging is enabled within the given realm; an indication of whether export of data from a first memory, which is subject to access control by the memory access circuitry, to a second memory is permitted; and key material for derivation of at least one secret key for protecting data associated with the given realm. In addition the security configuration parameters may also include the identification of the trusted intermediary realm as discussed above.

The realm management unit may be implemented in different ways. In one example the realm management unit may be a dedicated hardware unit which enforces the security protections provided by the realm scheme. In other examples the realm management unit may comprise software executing on the processing circuitry, which is distinct from the software associated with each realm.

The above examples describe an apparatus having the memory access circuitry and realm management unit discussed above. However in another example a corresponding computer program may be provided for controlling a host data processing apparatus to provide an instruction execution environment for execution of instructions. The computer program may comprise memory access program logic and realm management program logic which corresponds in functionality to the memory access circuitry and realm management unit discussed above. For example the computer program may be a simulator program which may present, to software executing on the simulator, a similar execution environment to that which would be provided by an actual hardware apparatus, even though there may not be any actual hardware providing the architectural features expected by the software within the host computer which is executing the simulator computer program. Instead the functionality of the expected hardware architecture, including the enforcement of ownership rights and the management of a realm based on commands issued by the realm's trusted intermediary realm, may be emulated by providing program logic, such as sets of instructions or data structures, which enable a generic host computer to execute code intended for execution on apparatus with the realm protections discussed above, in a manner compatible with the result that would be achieved on an apparatus which actually has the memory access circuitry and realm management unit discussed above. The simulator computer program for controlling the host data processing apparatus may be stored on a storage medium, which may be a non-transitory storage medium.

Figure 1:
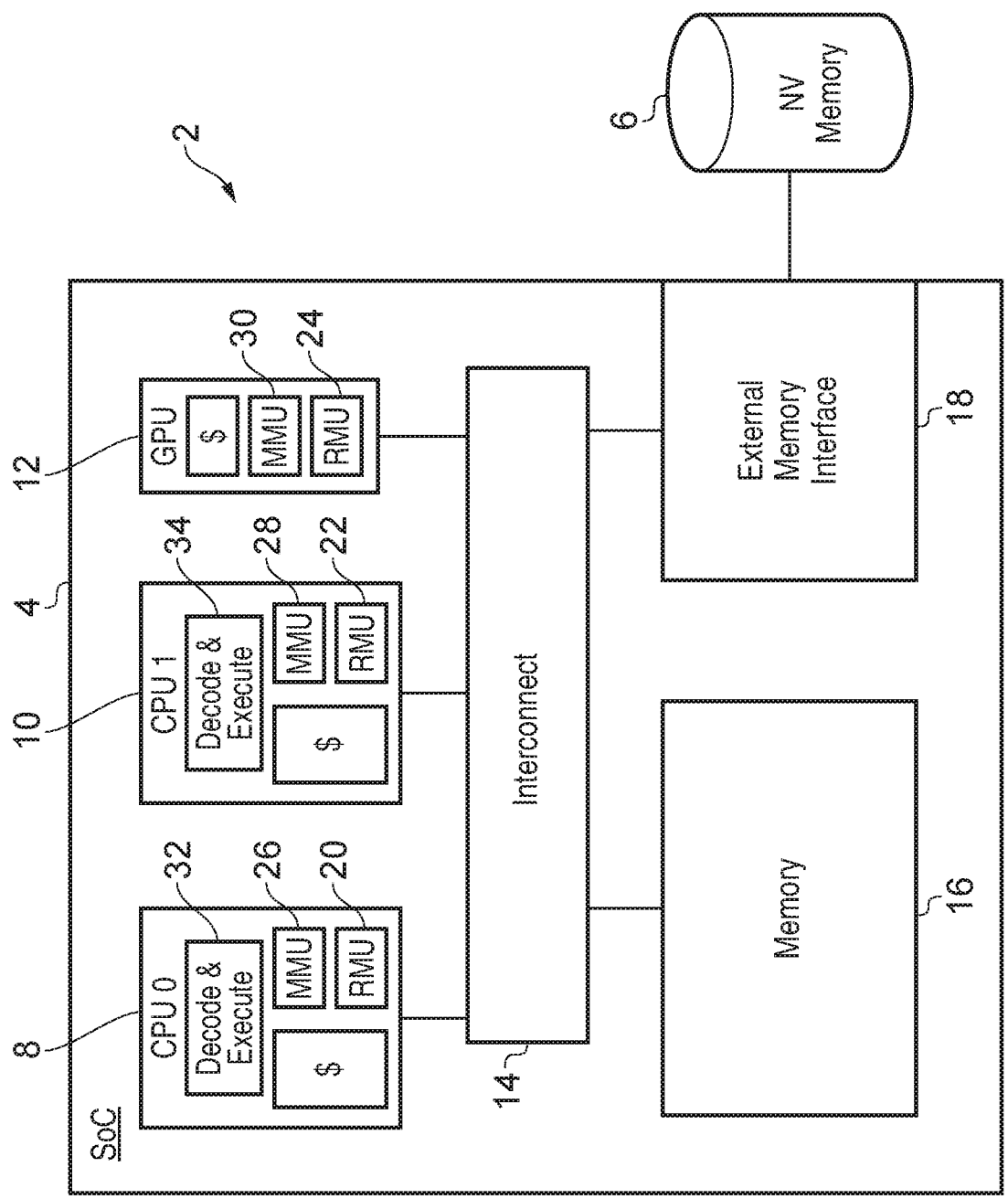

FIG. 1 schematically illustrates a data processing system 2 comprising a system-on-chip integrated circuit 4 connected to a separate non-volatile memory 6, such as an off-chip flash memory serving as a mass storage device. The system-on-chip integrated circuit 4 comprises a plurality of processing elements in the form of (in this example embodiment) two general purpose processors (CPUs) 8, 10, and a graphics processing unit (GPU) 12. It will be appreciated that in practice, many different forms of processing element may be provided, such as additional general purposes processors, graphics processing units, direct memory access (DMA) units, coprocessors and other processing elements which serve to access memory regions within a memory address space and perform data processing operations upon data stored within those memory regions.

The general purpose processors 8, 10 and the graphics processing unit 12 are coupled to interconnect circuitry 14 via which they perform memory transactions with an on-chip memory 16 and the external memory 6 (via an external memory interface 18). Although the memory 16 is on-chip in FIG. 1, in other embodiments the memory 16 could instead be implemented as an off-chip memory. The on-chip memory 16 stores data corresponding to a plurality of memory regions within an overall memory address space. These memory regions correspond to memory pages and are subject to management operations that control which memory regions (pages) are present within the on-chip memory 16 at a given time, which processes have access to the data stored within those memory regions and other parameters associated with those memory regions. More particularly, in this example embodiment, each of the processing elements 8, 10, 12 includes a realm management unit 20, 22, 24 and a general purpose memory management unit 26, 28, 30. The general purpose memory management units 26, 28, 30 serve to control aspects of the operation of the memory regions such as address mapping (e.g. mapping between virtual addresses and intermediate physical addresses, or physical addresses), privilege level constraints upon processes able to access given memory regions, storage characteristics of data within given memory regions (e.g. cacheability, device memory status, etc.) and other characteristics of regions of memory.

The realm management units 20, 22, 24 manage data serving to enforce ownership rights of the plurality of memory regions whereby a given memory region has a given owning process (or owner "realm") specified from among a plurality of processes (a process or realm being, for example, one of a monitor program, a hypervisor program, a guest operating system program, an application program, or the like, or a specific sub-portion of such a program). The given owning process (owner realm) for a given memory region has the exclusive rights to control access to the given own data stored within that given memory region. In particular, the owner process has the right to prevent access to its owned memory region by processes executed at a greater privilege level than the owner process.

Hence, a plurality of memory regions is divided amongst a plurality of owner realms. Each realm corresponds to at least a portion of at least one software process, and is allocated ownership of a number of memory regions. The owning process/realm has rights to control access to the data stored within the memory regions of their realm, including the right to exclude more privileged processes from accessing the owned regions of the realm. Management and control of which memory regions are memory mapped to each realm is performed by a process other than the owner realm itself. Using this arrangement it is possible for a process, such as a hypervisor, to control which memory regions (pages of memory) are contained within realms owned by respective guest virtual machines (guest operating systems) managed by that hypervisor and yet the hypervisor itself may not have the rights to actually access the data stored within the memory regions which it has allocated to a given realm. Thus, for example, a guest operating system may keep private from its managing hypervisor the data stored within the realm of that guest operating system, i.e. within the memory regions which are owned by that guest operating system.

The division of the memory address space into realms, and the control of ownership of those realms, is managed via the realm management units 20, 22, 24 associated with each of the processing elements 8, 10, 12 and is a control process which is orthogonal to the more conventional forms of control provided by the general purpose memory management units 26, 28, 30. The realm management units 20, 22, 24 accordingly provide memory access circuitry to enforce ownership rights of the memory regions of the memory address space. In some cases the memory access circuitry which enforces realm ownership rights may also include part of the MMU 26, 28, 30 (e.g. a TLB in the MMU 26, 28, 30 may include some control data for controlling accesses based on the realm controls provided by the RMU 20, 22, 24, to avoid needing to access two separate structures). In this example embodiment each of the processing elements 8, 10, 12 contains its own realm management unit 20, 22, 24; this is advantageous for performance purposes. However, more generally the memory access circuitry which enforces ownership rights may comprise a single instance of a realm management unit, the combination of all the realm management units 20, 22, 24 present, or a subset of those realm management units 20, 22, 24 present. Thus, the memory access circuitry for enforcing ownership rights may be distributed across the system-on-chip integrated circuit 4 in association with different processing elements 8, 10, 12, or collected together in a one location or in some other arrangement.

The processing elements comprising the general purpose processors 8, 10 are illustrated as including respective decoding and execution circuitry 32, 34 which decode and execute program instructions. These program instructions include commands which serve to control the management of memory regions within different ownership realms of the memory address space (realm management commands or RMU Commands). As an example, the program instructions executed may include program instructions designated as realm management unit commands and which are directed to the associated realm management unit 20, 22, 24 when they are encountered within the program instruction stream in order that they can be executed (actioned) by the relevant realm management unit 20, 22, 24. Examples of realm management unit commands include commands to initialize new realms or invalidate existing realms, commands to allocate memory regions to particular realms, remove memory regions from particular realms, export the data contained within a memory region from a first memory 16 to a second memory 6 with encryption and other processes being performed upon the exported data such that it is protected within the second memory 6. Further realm management unit commands are provided to import data back from a second memory 6 to a first memory 16 with associated decryption and validation operations performed upon the imported data.

In the context of such exports and imports of data from memory regions, it will be appreciated that a first memory, such as the on-chip memory 16, is closely managed by the realm management units 20, 22, 24 within the system-on-chip integrated circuit 4 and accordingly those realm management units 20, 22, 24 are able to enforce ownership rights and restrict access to the data within a given memory region to the process owning that memory region, or those processes which the owning process has granted access. However, when the data within that memory region is exported, such as to the external non-volatile memory 6, which is a second memory, then the control over access provided by the realm management units 20, 22, 24 is no longer effective and accordingly the data requires protection in some other way. This is achieved by encrypting the data within a memory region using before it is exported, and then decrypting that data with a secret key when it is imported back to the on-chip memory 16.

The export process may be accompanied by the generation of metadata specifying characteristics of the exported data. Such metadata may be separately stored within a metadata memory region of the first memory (on-chip memory 16) where it is held private to realm management units 20, 22, 24 (i.e. only accessible to such realm management units 20, 22, 24 and not to any of the existing processes) such that when the data is imported back to the on-chip memory 16, the metadata can be read for that imported data and the characteristics of the data represented in the metadata can be checked against the characteristics of the imported data to ensure the integrity of that imported data (e.g. checksums, data size, signatures etc.). It may be that private data of the realm management units 20, 22, 24 (including the above metadata characterising exported regions/pages) needs to be exported from the on-chip memory 16 to the off-chip non-volatile memory 6 (e.g. to make space within the on-chip memory 16) and in this circumstance the RMU-private metadata itself can be encrypted for its protection and new metadata characterising the exported metadata can be retained within the on-chip memory 16 (such retained metadata being significantly smaller in size than the exported metadata) in order that the encrypted and exported metadata can be checked and validated when it is imported back to the on-chip memory 16 for use.

Such metadata describing characteristics of memory regions and the data stored within the memory regions may be arranged as part of a hierarchical structure, such as a metadata memory region tree having a branching pattern. The form of such a metadata memory region tree may be determined under software control as different regions of the memory address space are registered to serve as metadata regions owned by the realm management units 20, 22, 24. It will be appreciated that whilst the software which controls the registering of such memory regions is able to allocate, de-allocate and control the relationships between memory regions serving to store metadata, such software does not itself own the data contained within those memory regions in the sense of being able to control which processes have access to such data. In the case of memory regions which are private to the realm management units 20, 22, 24 (i.e. the memory management circuitry), such access rights may be restricted to only the realm management units 20, 22, 24 themselves and the such RMU-Private data will not be shared with any other process(es).

When the given data stored within a given memory region is exported, then the memory region concerned is made invalid so that the contents are inaccessible. To reuse this page the page is made "Valid", by using a Clean command which overwrites the memory region with other data uncorrelated to the previous content in order that such previous content is not made accessible to another process when that given memory region is released for use by another process. For example, the content of a given memory region may be all written to zero values, or written to a fixed value, or written to random values thereby overwriting the original content of the memory region. In other examples, the overwriting of the contents of the exported memory region could be triggered by an export command itself, rather than a subsequent clean command. Either way, the given owned data being exported may be overwritten with values uncorrelated with the given owned data before the given memory region is made accessible to a process other than the given owning process. When a given memory region owned by a given process is to be exported, as part of the export process, the realm management unit 20, 22, 24 which is executing the realm command to perform the export takes ownership of the memory region concerned from the given process (i.e. makes the region RMU-Private), locks access of that memory region against all other processes (and other realm management units), performs the export operation (including encryption, metadata generation and overwriting), and then unlocks the access to that memory region and releases ownership of that memory region. Thus, a memory region which is in the process of being exported, or imported, may be held private to the realm management unit concerned whilst that command is being performed.

Figure 2:
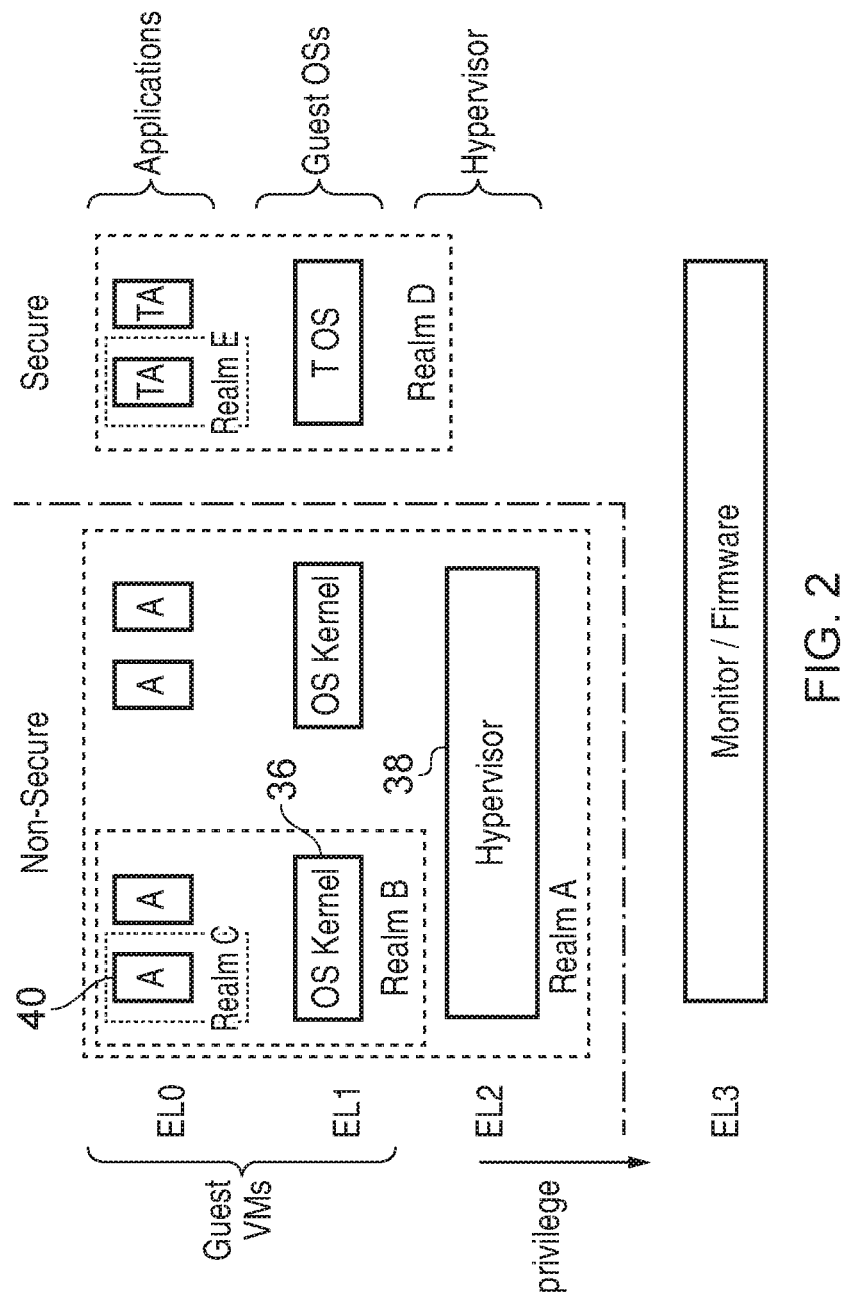

FIG. 2 schematically illustrates the relationship between a plurality of processes (programs/threads), a plurality of exception levels (privilege levels), a secure and a non-secure processor domain, and a plurality of realms representing ownership of given memory regions. As illustrated, a hierarchy of privilege levels extends from exception level EL0 to exception level EL3 (with exception level EL3 having the highest level of privilege). The operating state of the system may be divided between a secure operating state and a non-secure operating state as represented by the secure domain and the non-secure domain in, for example, processors using the TrustZone® architecture provided by ARM® Limited of Cambridge, UK.

As illustrated in FIG. 2, the memory access circuitry (realm management units 20, 22, 24 and associated controlling software (e.g. millicode running one the realm management units)) manage a plurality of realms within the execution environment. A given memory region (memory page) is owned by a particular realm. A realm may have child realms within it, and grandchild realms within those child realms (e.g. see realm A (parent), realm B (child), and realm C (grandchild)). Memory regions for which ownership is given to realm A may have their ownership in turn passed from realm A to realm B under control of processes owned by realm A. Thus, a parent realm is able to give ownership of regions to its own child realm(s). Those child realms in turn may pass ownership of memory regions which they have received from their parent realm to then be owned by their own child realms (e.g. realm C) which is a grandchild realm of the original realm, namely realm A. The processes within a given realm may execute at the same privilege level or at different privilege level. The realm to which a process belongs is accordingly an orthogonal parameter to the privilege level of a process, although in many practical cases the realm and the privilege level may correspond as a convenient mechanism for moving between realms may involve the use of exceptions which themselves move the system between different privilege levels (exception levels).

Figure 3:
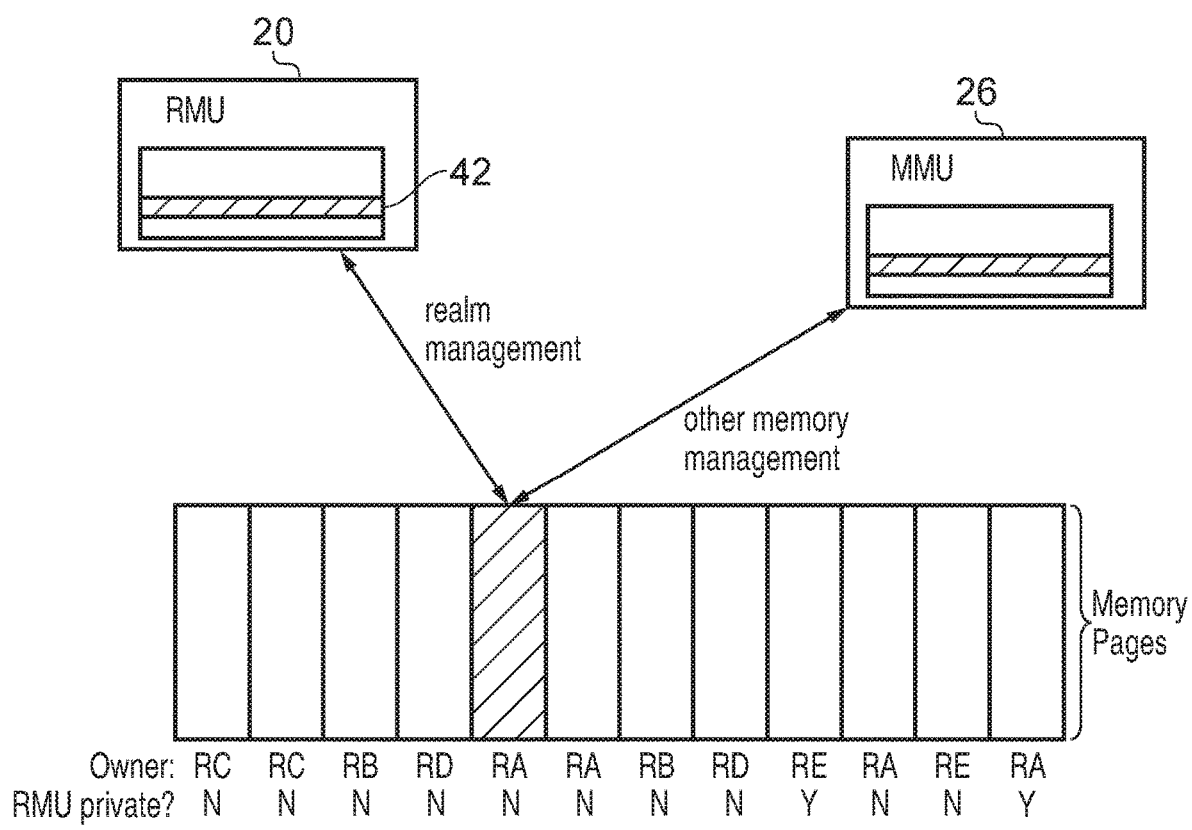

FIG. 3 schematically illustrates a realm management unit 20 and a general purpose memory management unit 26 which respectively perform different management operations upon a plurality of memory pages (memory regions) stored within the on-chip memory 16. As illustrated, the realm management unit 24 uses a plurality of realm descriptors 42 with each descriptor specifying properties of a realm. The realm management unit 24 may also maintain a realm granule table (or ownership table) comprising entries indexed by physical address, each entry including information for a corresponding memory region, including an indication of which realm that memory region belongs to, i.e. which realm has the exclusive rights to control access to control data within that memory region even if it does not control whether or not it itself actually owns that memory region. The realm descriptors and realm granule table entries may be stored in memory 16, but could also be cached in the RMU itself. Thus, as illustrated in FIG. 3, the different memory regions have different owning realms as indicated by the realm designations RA, RB, RC, RD and RE. Some of the memory regions are also owned by (private to) the realm management unit 20 and are marked as RMU-Private. Such RMU-Private regions may be used to store metadata describing characteristics of other memory regions, temporarily store memory regions being exported or imported, or for other purposes of the realm management unit 20 itself. The RMU-private regions may still be owned by a corresponding owner realm, but may not be accessible to general purpose read/write accesses issued by the owner realm (instead RMU commands issued to the RMU 20 may be required to trigger the RMU 20 to make any changes to RMU-private regions).

The addressing of memory regions may be by virtual, intermediate physical or physical addresses depending upon the particular system concerned. The realm management unit 20, and the general purpose memory management unit 26, may accordingly store translation data enabling received addresses (whether they be virtual memory addresses or intermediate memory addresses), to be translated to an address, such as a physical address, more directly representing the memory region within the on-chip memory 16 concerned. Such address translation data may be managed and distributed within the system on-chip integrated circuit 4 using translation look aside buffers and other distributed control mechanisms.

Figure 4:
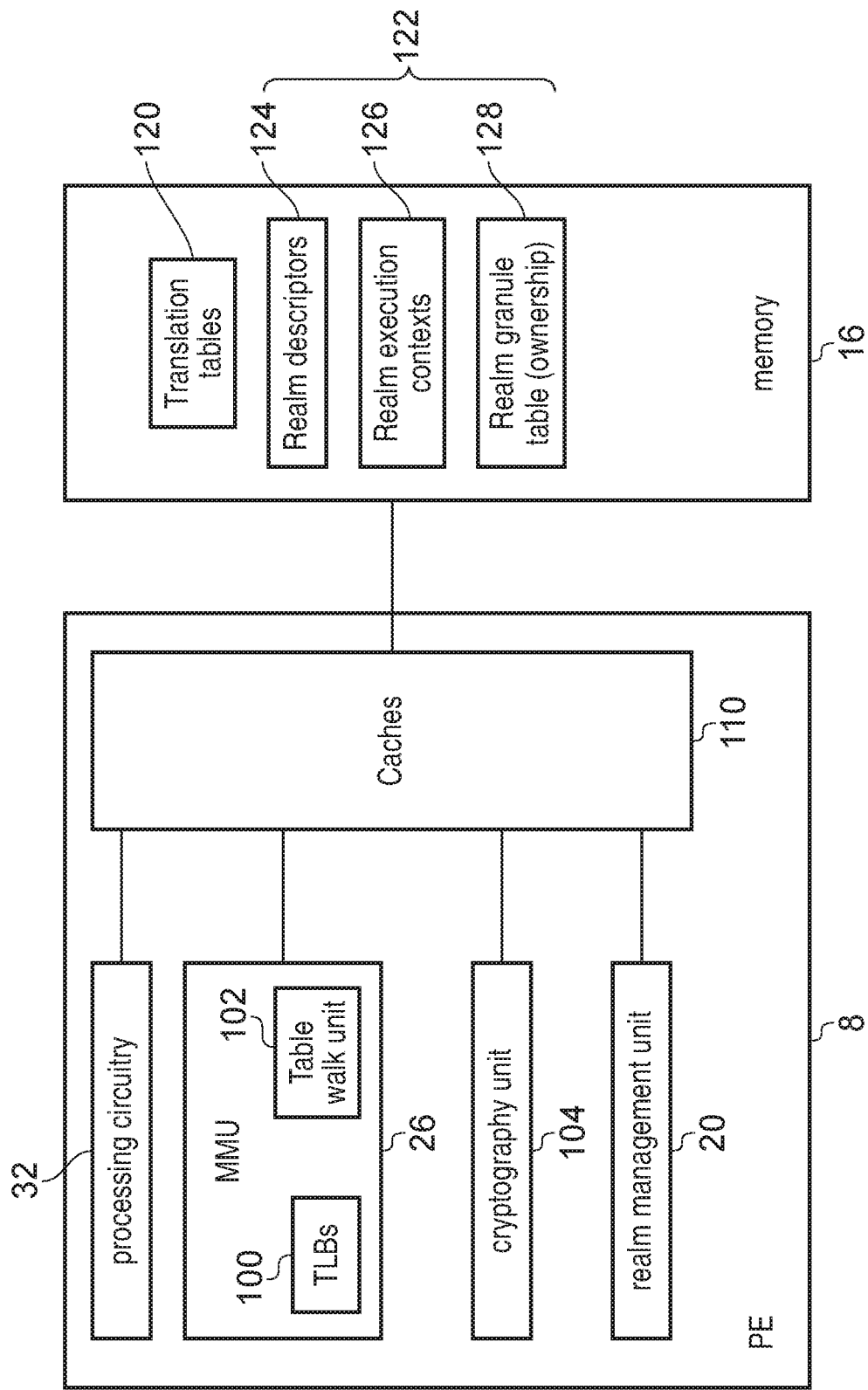
FIG. 4 illustrates a more detailed example of a processing element and realm management control data stored in memory.

FIG. 4 illustrates a more detailed example of one of the processing elements 8, 10, 12 of FIG. 1 and of the control data stored in the memory 16 for controlling memory accesses. For ease of explanation, FIG. 4 shows the CPU 0 as the processing element 8, but it will be appreciated that the processing element could also be CPU 1 10 of the GPU 12 or any other processing elements within a data processing apparatus 2. As shown in FIG. 4, the processing element 8 includes processing circuitry 32 (which may comprise the decode and execute logic described above), a memory management unit 26, which may include one or more translation lookaside buffers 100 for caching entries of the translation tables (which may also be appended with realm-based control data from the RMU 20 if shared MMU-RMU TLB structures are used), and a table walk unit 102 for controlling allocation of data to the TLBs 100 and triggering walk accesses to memory to locate the required data used to control whether a given memory access is allowed to be performed. The processing element 8 may also include a cryptographic unit 104 which may perform cryptographic operations for encrypting or decrypting data, for example for use in the paging (export/import) operations discussed above. The processing element 8 also includes a number of caches 110 which may cache data or instructions read from the memory 16. If accesses to memory triggered by the processing circuitry 32 or by the table walk unit 102 miss in the caches, the data can be located from main memory 16.

The processing element 8 also includes a realm management unit 20 as discussed above. In some embodiments the realm management unit (RMU) 20 may be provided as a hardware circuit. However, some of the RMU operations discussed below may be relatively complex to implement purely in hardware, for example if they require multiple accesses to different memory regions to be performed. Therefore, in some examples the RMU 20 may be implemented using program code which may be stored within the data processing apparatus 2 and may be executed using the general purpose processing circuitry 32. Unlike general purpose software which may be written to memory 16 and may be rewritable, the RMU software (millicode) could be installed in a relatively permanent manner on the data processing apparatus so that it cannot be removed, and may be regarded as part of the platform provided by the processing system. For example the RMU program code could be stored within a read only memory (ROM). Hence, the RMU may comprise a hardware unit, or may comprise the processing circuitry 32 executing realm management software, which is triggered to execute by RMU commands included in the general purpose software executed by the processing circuitry 32. In some examples, the RMU 20 may be implemented using a combination of hardware and software, e.g. some simpler functionality may be implemented using hardware circuits for faster processing, but more complex functions may be implemented using the millicode. Hence, it will be appreciated that subsequent references to the RMU may refer to either hardware or software or a combination of both.

As shown in FIG. 4, the memory 16 may store a number of pieces of control information used by the MMU 26 and RMU 20 for controlling access to memory. These include translation tables (also known as page tables) 120, which define memory access attributes for controlling which processes are allowed to access a given memory region, as well as address mapping information for translating virtual addresses to physical addresses. The translation tables 120 may be defined based on the exception levels discussed above with respect to FIG. 2, so that a process executing at a more privileged exception level may set permissions which govern whether processes executing at less privileged exception levels are allowed to access the corresponding memory regions.

Also, a number of realm management tables or realm control information 122 are provided for controlling memory access in an orthogonal manner to the MMU page tables 120, to allow a less privileged process to control whether a more privileged process is accessed (the realm control is orthogonal to the MMU control in the sense that, for a memory access request to be serviced, it may need to pass both types of access control checking). With the realm management table, an owner process (realm) which owns a given memory region has the right to exclude processes executing at a more privileged exception level from accessing that memory region. The realm management data includes realm descriptors 124 which describe properties of a given realm. Each realm corresponds to at least a portion of at least one software process executed by the processing circuitry 32. Some realms may correspond to two or more processes, while other realms may correspond to only a sub portion of a given software process. A realm can also be viewed as mapping to a given region of the memory address space (with the processing circuitry 32 executing within a given realm when it is executing program instructions which lie within the corresponding region of the memory address space). Hence, a realm can be seen either as a set of software processes or a portion of a software process, or as an area of the memory address space. These two views are equivalent. For ease of explanation the subsequent description will refer to a realm as at least a portion of at least one software process, but the corresponding view of a realm as a collection of memory regions is equally valid (in this case, "entry" and "exit" to/from a realm may corresponding to program execution reaching/leaving the part of the memory address corresponding to the realm).

The realm management data 122 also includes realm execution context regions 126 which can be used for saving and restoring architectural state associated with a given realm upon realm exit or entry. The realm management data also includes a realm granule table (or ownership table) 128 which defines, for each region of the memory address space which realm is the owner realm for that memory region. The owner realm for a given memory region has the right to exclude other realms (including more privileged processes) from accessing data stored within that memory region. Use of this realm management data is discussed in more detail below. In general, the realm management unit 20 and MMU 26 can be seen as memory access circuitry which enforces the ownership rights defined by an owner realm for the memory regions owned by that realm. This can be particularly useful, for example, for a cloud platform in which a number of virtual machines 36 provided by different parties may be executing under control of a hypervisor 38 provided by the cloud server operator. A party providing one of the virtual machines may not wish their data and code to be accessible to the hypervisor. By introducing the concept of realms where a realm executing at a less privileged exception level can exclude a more privileged exception level from accessing its data or instructions, this enables a blind hypervisor to be provided which can increase the confidence of code developers to install their software on a cloud service where the physical hardware may be shared with code provided by other parties.

Figure 5:
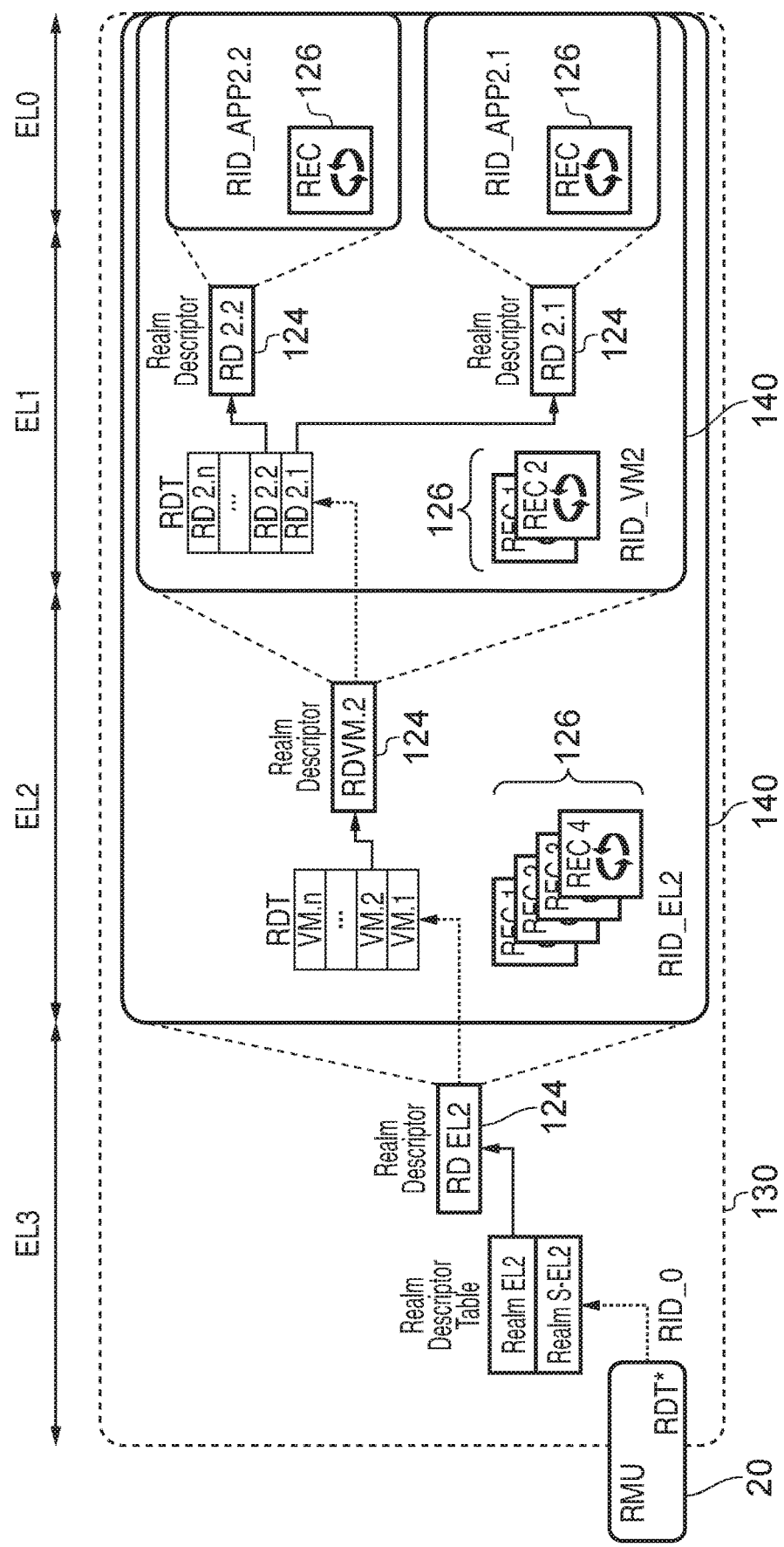
FIG. 5 shows an example of a hierarchy of realms in which a parent realm can define realm descriptors describing properties of various child realms.

As shown in FIG. 5, the realms are managed by the RMU 20 according to a realm hierarchy in which each realm other than a root realm 130 is a child realm which has a corresponding parent realm which initialized the child realm by executing an initialization command. The root realm 130 may for example be a realm associated with the monitor code or system firmware executing at the most privileged exception level EL3. For ease of explanation, the example of FIG. 5 and the initial examples discussed afterwards show cases where each child realm executes at a lower privileged level than its parent realm. However, as will be discussed below it is also possible to establish a sub-realm which executes at the same exception level as its parent.

In general, for the realm management part of the memory access control provided by the MMU 26, a child realm has default access to any memory regions owned by its parent realm. Similarly, any descendants of a given realm are assumed to have access to the given realm's owned memory regions. However, as the realm management control is orthogonal to the control provided by the translation tables 120 based on exception level, a process executing at a higher privilege level can still exclude less privileged code from accessing its data, by setting parameters of the translation tables 120 accordingly. Hence, in general a given child realm has a right to exclude its parent realm from accessing data stored in a given memory region owned by the given child realm. Whether the child realm actually excludes the parent realm from accessing a given memory region may be set based on control attributes set in the ownership table 128 (the default may be that the parent realm has no access to the child realm's owned regions, but the child realm may choose to grant access to the parent realm by setting the visibility attributes accordingly). When there are multiple sibling realms (different child realms sharing the same parent realm) then a given child realm may exclude a sibling realm from accessing the data stored in a given memory region owned by the given child realm. Again, visibility attributes set in the ownership table 128 may control the extent to which sibling realms can access each other's data. Alternatively, access by sibling realms may be controlled based on the parent visibility attribute, so that if a child real makes a page visible to its parent realm, the same page also becomes visible to its sibling realms and further descendants of the sibling realms. In some cases the ownership table 128 may have a global visibility attribute which may allow a given owner process to enable any process executing under any realm to access the data within its owned memory region.

As shown in FIG. 5, each realm 140 is associated with one or more realm execution context (REC) memory regions 126 which can be used for storing architectural state of the realm, such as register values, when exiting from a given realm. The number of RECs 126 provided for a given realm may depend on how many threads of execution are operating under a given realm. For example a realm when first initialized may be established with a single primary REC region 126, but then the realm may configure other memory regions owned by that realm to act as further RECs as necessary. The REC memory regions are owned by the corresponding realm whose execution state is stored to that REC.

Each realm is associated with a realm descriptor 124 which is stored in a memory region which is owned by the parent realm of the realm whose properties are described in the realm descriptor 124. For flexibility in the number of child realms which can be defined at a given generation of realm, the realm descriptors are managed using a tree structure called the realm descriptor tree (RDT) which will be discussed in more detail later. A realm descriptor 124 can be used to define properties of the realm which can be checked by the RMU 20 on entry or exit from a realm to ensure security. The realm descriptor may also track progression of a realm through various lifecycle states so that execution of certain RMU commands for a realm may be restricted to particular lifecycle states, to ensure that realms are created and invalidated in a secure manner.

Figure 6:
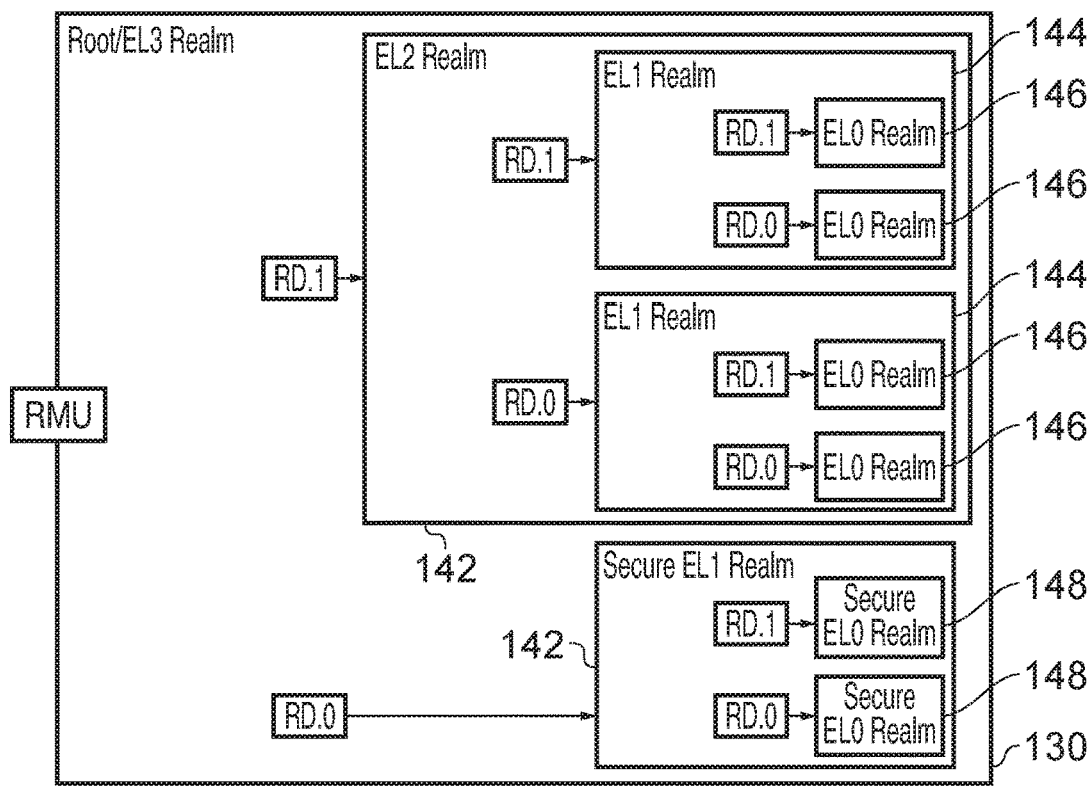
FIGS. 6 and 7 illustrate two different examples of a realm hierarchy.
Figure 7:
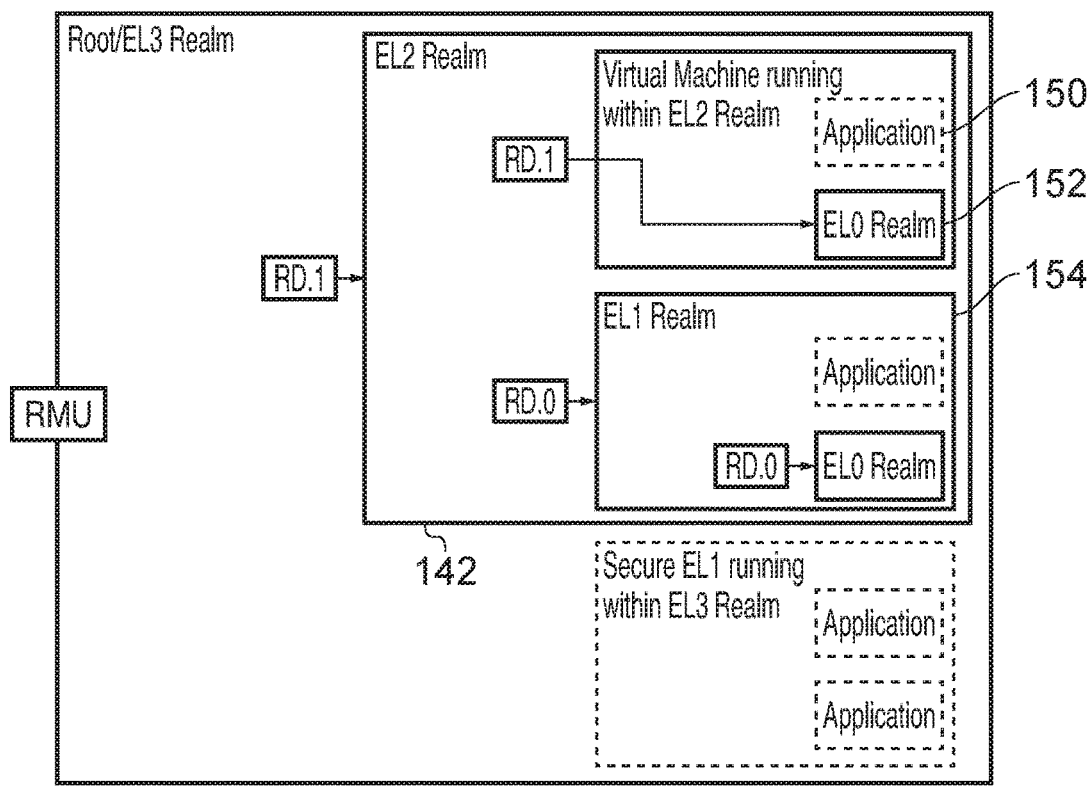

FIGS. 6 and 7 show two different examples of possible realm hierarchies. In the example of FIG. 6, each of the processes shown in FIG. 2 has its own realm defined. Hence, the root realm 130 corresponds to the monitor software or firmware operating at exception level EL3. The root realm defines two child realms 142, one corresponding to the secure operating system operating at secure ED and another corresponding to the hypervisor at EL2. The hypervisor defines grandchild realms 144 corresponding to different guest operating systems at ED and each of those guest operating systems define further great-grandchild realms 146 corresponding to applications executing at the least privileged exception level EL0. Similarly the secure operating system in realm 142 can define grandchild realms 148 corresponding to different secure applications. A parent realm in the hierarchy can transfer ownership of a memory page that it currently owns to a new child realm (by using a Granule.Add command as discussed below), or can make one of its pages invalid, map it into a child's virtual address space, and allow the child realm to claim ownership of the page by executing a page ownership (Claim) command. A page ownership command may be rejected if the specified page of the memory address space is not already owned by the parent realm which issued the command.

As shown in FIG. 7, it is not essential for processes at every level of privilege to have separate realms, and so some of the privilege level boundaries shown in dotted lines in FIG. 7 may not correspond to a realm boundary. For example in FIG. 7 the application 150 and its operating system execute within the same realm as the hypervisor realm 142 operating at exception level EL2, and so a single realm spans both the EL2 hypervisor code, an operating system operating at ED and the application at EL0. On the other hand a different application 152 under the same hypervisor may have its own separate realm defined. In this case the realm boundary is between ED and EL0 and there is no EL2-EL1 realm boundary (both the hypervisor and operating system may execute in the same realm). For another operating system, a separate ED realm 154 may be defined, which again may have some applications which execute within the same realm as the operating system, and other applications which have their own dedicated realm. Similarly, on the secure side, the secure OS and applications in FIG. 7 execute entirely within the EL3 root realm, and so there is no realm boundary when operating on the secure side. Hence, the precise configuration of realms may be determined at run time for a given system depending on the needs of the processes being executed. Software can decide at runtime whether it requires only a small and fixed number of child realms (which might be the case for low-level firmware) or needs many realms or a varying number of realms (which might be useful for a hypervisor on a cloud platform for example, which may manage an unknown number of guest virtual machines).

Figure 8:
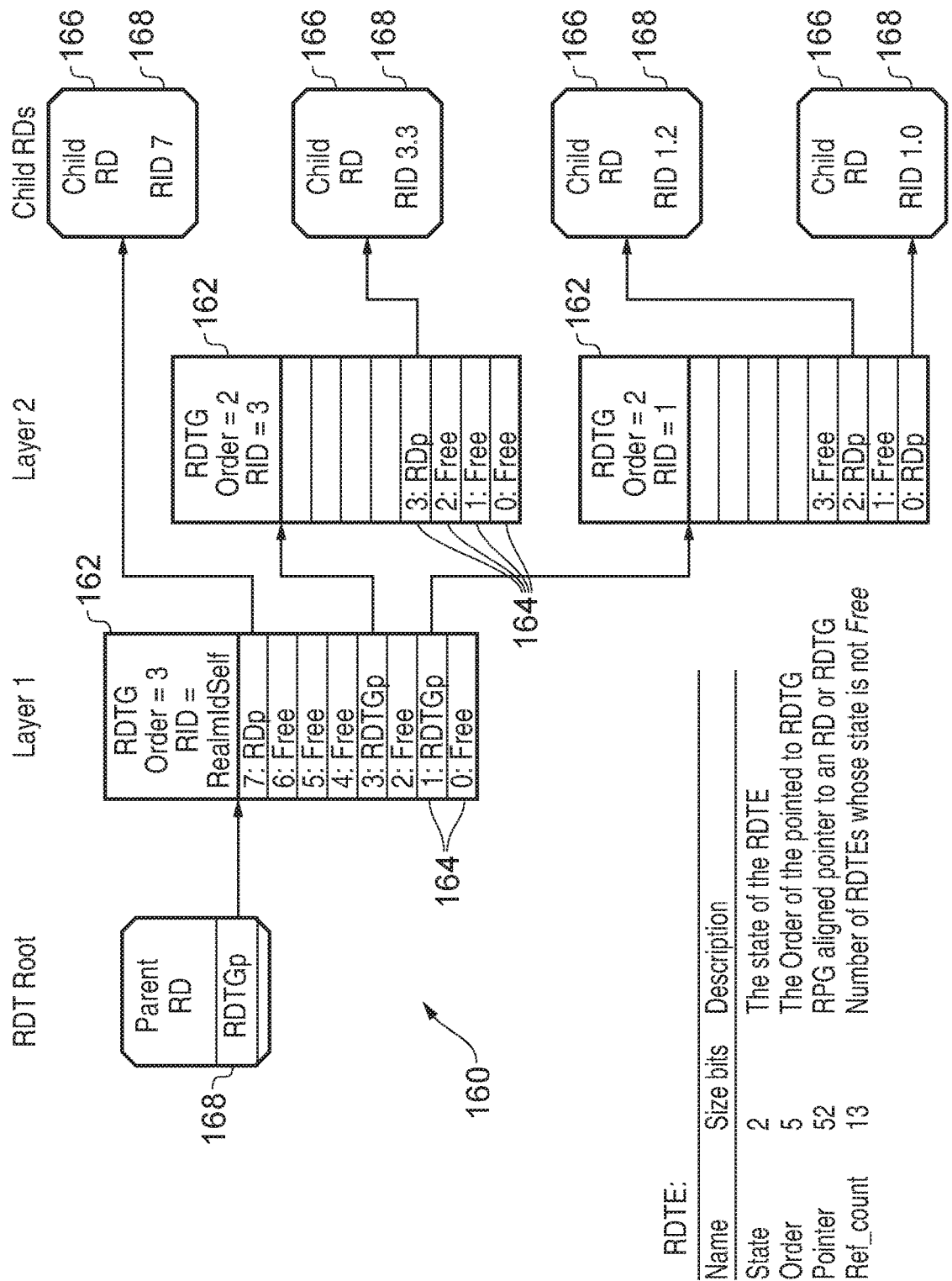
FIG. 8 shows an example of a realm descriptor tree maintained by a parent realm to record the realm descriptors of its child realms.

The realm descriptors 124 for a given parent realm are managed according to a realm descriptor tree (which is an example of a realm management tree which defines the realm management data for a number of child realms of that parent realm). The tree has a variable number of levels. FIG. 8 shows an example of such a realm descriptor tree 160 managed by a particular parent realm. The tree 160 comprises a number of realm descriptor tree granules (RDTG) 162 which each comprise a number of realm descriptor tree entries (RDTE) 164. Each RDTE 164 provides a pointer to either a realm descriptor 166 for a given child realm of the parent realm, or a further RDTG 162 for the next level of the realm descriptor tree. The RDTG 162 for the first level of the tree may be identified by a realm descriptor tree pointer 168 which may be stored as part of the data associated with the parent realm (e.g. with the parent realm's realm descriptor). Hence, when the parent realm issues an RMU command associated with a given child realm it can trigger the RMU to traverse the realm descriptor tree in order to locate the required child realm's realm descriptor 166 (if that realm descriptor is not already cached within the RMU 20). Each RDTG 162 may have a variable number of entries 164.

As shown in the table in FIG. 8, a given RDTE 164 which provides a pointer to an RDTG 162 at a subsequent level of the tree may include an order value which indicates the maximum number of entries in the pointed to RDTG. For example, the order value may indicate a power of two corresponding to the total number of entries in the pointed to RDTG. Other information which can be included in the RDTE 164 may include a state value indicating the state of the RDTE (e.g. whether the RDTE is free for allocation of realm descriptor tree data, and whether the RDTE provides a pointer to a further RDTG 162 or to a child realm descriptor 166). In addition to the pointer, the RDTE may also include a reference count which may track the number of RDTEs in the pointer to RDTG which are not free, which can be useful for determining whether further RDTEs an be allocated to that RDTG 162. RMU commands triggered by the parent realm may control the RMU 20 to establish further RDTGs of the tree and/or edit the contents of RDTEs within existing RDTGs.

Note that the tree shown in FIG. 8 shows the child realms of one particular parent realm. Each other parent realm may have a separate realm descriptor tree tracking its own child realms. The data associated with the tree, including the RDTGs 162 and the child realm descriptors 166, are stored within pages owned by the parent realm and so other realms can be excluded from accessing this data. Therefore, only the parent realm may have visibility of which particular child realms it configured, so that processes executing at higher privilege levels may have no visibility of what realms have been created below any child realms which it has directly created itself.

As shown in FIG. 8, each of the child realms of a given parent realm may have a corresponding realm identifier (RID) 168, which is used by that parent realm to identify a particular child realm. The RID is a local realm identifier in that it is specific to a particular parent realm. Child realms of different parent realms may have the same local RID. Although it is possible to use local RIDs which have arbitrary values selected by the parent realm for a given child realm, in the approach shown in FIG. 8, the local RID for a given child realm has a variable number of variable length bit portions and each of the variable length portions is used by the RMU 20 to index into a given level of the realm descriptor tree 160. For example, the realm descriptor of the child realm having local RID=7 in FIG. 13 is accessed by following the realm descriptor pointer in entry 7 of the first level RDTG 162. The realm descriptor of child realm with local RID=3.3 is accessed by following entry 3 in the first level of the tree and then entry 3 in the second level of the tree. Similarly the realm descriptor for child realm with local RID=1.2 is accessed by following entry 1 in the first layer and entry 2 in the second layer. Note that while FIG. 8 shows the local RIDs for conciseness using decimal values 7, 3.3 etc., these would be implemented as concatenations of binary digits in the processing apparatus 2.

The RID for a given realm may comprise a concatenation of the indices to be used at respective levels of the realm descriptor tree to access the realm management data for the given realm. Although it is not essential for the indices to be concatenated in the same order as the order in which they would be used for stepping through the tree, this can be preferred as it makes management of the tree accesses simpler. It is not important whether the concatenation goes from low to high or from high to low. The concatenation of indices may be followed by a predetermined termination pattern which can allow the RMU 20 to determine when there are no further levels of the tree to be stepped through.

Some implementations could apply this RID construction technique to a global realm descriptor tree which may store realm descriptors for all the realms within the system in a similar tree structure (with each of the RIDs being a globally unique value). However, software development can be made simpler by defining the child realms of a given parent within one tree and then having separate trees for each other parent realm to track its child realms. Hence the realm descriptor tree may be a local realm descriptor tree associated with a given parent realm for storing the realm management data of the child realms which have been initialized by the given parent realm. The realm identifier may therefore be a local realm identifier which identifies a particular child realm used by a given parent realm. Child realms initialized by different parent realms may be permitted to have the same value of the local realm identifier. In this way, a parent realm can select which RIDs are used for its child realms without being aware of what other realms have been established by other parent realms, with the RIDs for the child realms being constructed depending on the way in which the parent realm has configured its realm descriptor tree.

The local realm identifier can be used by realm entry instructions or RMU commands issued by software processes. However, the hardware infrastructure may use an absolute identification of a given child realm to distinguish realms created by different parents. Hence, in addition to the local realm identifiers shown in FIG. 8, a given realm may also have a global realm identifier (or "internal" realm identifier) which is unique to the given realm. At least one hardware structure may identify a given realm using a global realm identifier (GRID) instead of a local realm identifier (LRID). For example, the realm granule table 128 and/or TLBs 100 may identify realms using the global realm identifier.

In some examples an arbitrary binary value could be allocated as the GRID for a given realm, which can be completely unrelated to the LRID used by the parent realm to refer to that child realm. Different micro-architectural implementations of the same realm architecture could use different approaches for allocating the GRID.

However, in one example the GRID for a given realm may be constructed based on the LRIDs of its ancestor realms. This can be useful because it can be enable simpler determination of whether a given realm is a descendant of another realm or an ancestor of another realm which may be useful for the access control by the MMU 26 and RMU 20.

It is not essential for all local RIDs to be constructed using the concatenation of tree indices approach. In some cases it may be useful for particular values of the local RID to be reserved for referring to certain default realms. RMU commands specifying the current realm or the parent realm of the current realm may be relatively common. Hence, a predetermined RID value may be reserved for referring to the parent realm of the current realm. For example an LRID with all bits set to 1 (indicating a value of 1) could be reserved for referring to the parent realm of the current realm. Similarly, a predetermined realm identifier value may be reserved for referring to the current realm itself. For example a LRID value of 0 could be used to refer to the current realm.

The RMU may support certain query commands which may be triggered by a given realm in order to query constraints which it must satisfy when it is establishing its realm descriptor tree. For example, in response to the query command, the RMU 20 (or the processing circuitry 32) may return a constraint value which indicates at least one of a maximum number of levels of the realm descriptor tree 160 permitted to be defined by the given realm, a maximum number of tree entries permitted at a given level of the tree structure for the given realm, and/or a maximum number of child realms that may be initialized by the given realm. For example, the system may include registers which may indicate properties such as the number of bits available in the LRID or GRIDs used for a particular hardware implementation. The RMU or processing circuitry may, in response to the query command, check the number of bits available for the realm identifiers (or the appropriate response may be hardwired for the particular processor implementation), and could also check information specifying how many bits of the identifiers have been already used up by ancestor realms in the global realm identifier, in order to determine how many bits are available remaining for the current realm to define further children. The parent realm can use the response to a query command to decide how to construct its RDT.

FIG. 9 shows an example of contents of a realm descriptor 166 for a given realm. The realm descriptor may define security configuration parameters for the realm. It will be appreciated that this is just one example and other implementations may not include all of the listed information, or could it include additional information. In this example the realm descriptor includes the following:

- The global RID of the realm. Hence, by traversing the realm descriptor tree based on the local RID, the corresponding global RID can be identified and this can be used to index hardware structures such as the TLB by the given realm, or check ownership tables or other information defined based on the GRID.
- A lifecycle state of the given realm, which can be used by the RMU 20 to determine whether to accept a given command triggered by the given realm.
- A type of the given realm. For example, the realm type could indicate whether the realm is a full realm or a sub-realm as discussed later.
- A boundary exception level (BEL) value, which identifies a boundary exception level for the corresponding realm. The BEL indicates a maximum privilege level at which the realm is permitted to execute. For example, realm 142 in FIG. 7 may have a BEL of EL2, realm 152 may have a BEL of EL0, and realm 154 may have a BEL of EL1. By providing an explicit parameter identifying the BEL in the realm descriptor, this provides flexibility for realms to span multiple exception levels, as the BEL can be used on occurrence of an exception to determine whether the exception can be taken within the current realm or whether a realm exit to a parent realm is required to handle the exception.
- A resource count indicating the total number of memory regions (realm protection granules or RPGs) owned by the realm and its descendants. This is used to ensure that all memory pages owned by the realm and its descendants are invalidated (and ultimately wiped of data), before those memory regions can be allocated to a different realm. For example the resource count can be used to track how many regions still need to be scrubbed.
- Start and end addresses of a protected address range for the realm. For example the protected address range may define the range of memory address space within which pages can be owned by the corresponding realm. This can be useful for protecting against malicious parent realms reclaiming ownership of a region previously allocated to a child realm in an attempt to access the child realms data, since by comparing the protected address range defined in the realm descriptor with subsequent addresses of memory accesses, cases where a memory region previously owned by the realm is no longer owned by the realm can be identified.
- One or more encryption keys used by the cryptographic circuitry 104 to encrypt or decrypt data associated with a given realm. In this example two separate encryption keys are provided: a memory key for encrypting/decrypting contents and memory owned by the realm and a paging key for encrypting/decrypting data which is exported/imported between memory 16 to persistent storage 6 as discussed above. However in other examples the same key could be used for both purposes, or further keys could be provided for other specific purposes.
- A realm description tree entry (RDTE) which identifies the root of the realm descriptor tree. The RDTE in the realm descriptor provides a pointer for accessing the root RDTG (and the order value defining how many bits to use as the index for that RDTG).

A pointer to a primary REC (realm execution context) memory region for saving or restoring architectural state associated with execution of the realm.

As discussed in more detail below, the realm descriptor may also include other information such as identification of a trusted intermediary realm, information defining whether debugging or export is enabled for the realm, and an expected signature for checking against a signature of the realm's parameters on activation of the realm.

FIG. 10 shows a set of lifecycle states in which a given realm can exist, which in this example include a Clean state, a New state, an Active state and an Invalid state. FIG. 10 summarizes the properties of each state, indicating for each state: whether a realm in the corresponding state can have the parameters of its realm descriptor 166 modified by its parent realm, whether the encryption key specified for that realm can be validly used, whether the realm can own any memory regions (RPGs) and whether or not code associated with that realm is executable. Note that the parameters of the realm descriptor are modifiable in the Clean state but cannot be modified in any of the other states. This prevents a malicious parent realm updating the properties of a given realm after it has become active. Also the realm is executable only in the Active state.

Figure 11:
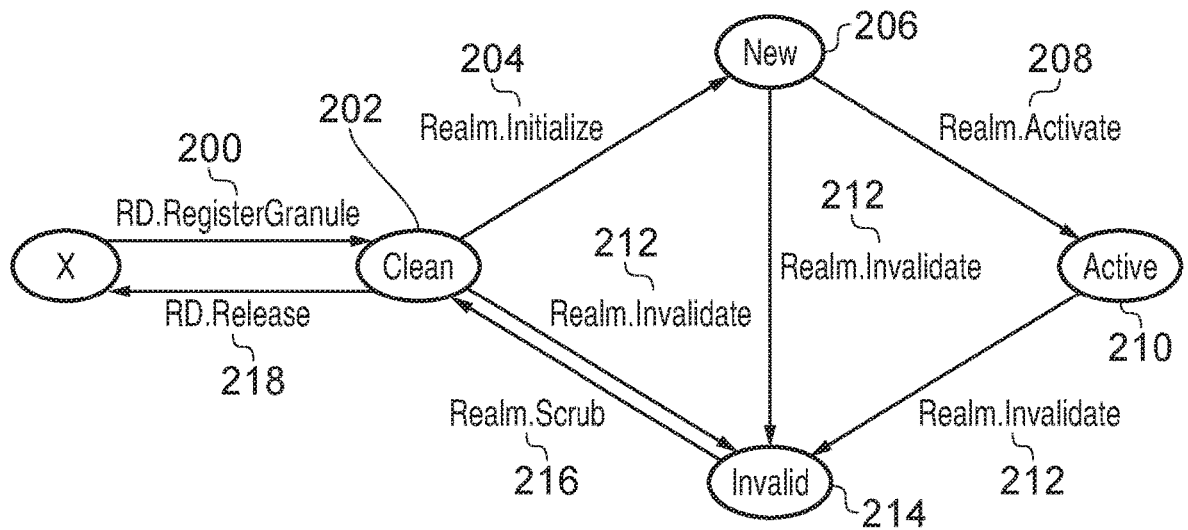
FIG. 11 is a state machine diagram indicating changes of lifecycle states of a realm.

FIG. 11 is a state machine diagram showing allowed transitions of lifecycle states of the realm. Each state transition shown in FIG. 11 is triggered by the parent realm issuing, to the RMU 20, a realm management command which specifies the local RID of the child target realm (the Realm.Invalidate command 212 can also be issued by the target realm itself). When no previous realm has been defined for that local RID and a realm descriptor register granule command 200 is executed by the parent realm, this triggers the configuration of a given memory region owned by the parent realm as a realm descriptor for the child realm having the specified local RID. The global RID for the child realm may be set based on the concatenation of the parent realm's global RID and the new local RID specified in the realm descriptor register granule command 200. The specified child realm then enters the Clean state 202. In the Clean state, the parent realm can set the properties of the child realm by updating the various parameters of the child realm's realm descriptor. These properties can be modified using further RMU commands issued by the parent realm (such realm descriptor modifying commands may be rejected if the specified child realm is not in the Clean state). Also, for realms associated with a trusted intermediary, the realm descriptor modifying commands may also be accepted if issued by the specified trusted intermediary realm identified in the realm descriptor of the target realm whose parameters are being modified. When the parent realm has finished setting the parameters of the child realm's realm descriptor, it executes a realm initialize command 204 specifying the child realm's LRID and this triggers a transition of the child realm from the clean state 202 to the New state 206, and at this point the parameters of the realm descriptor are no longer modifiable by the parent realm. A realm initialization command 204 will fail if the specified realm is not currently in the Clean state.

When a realm is in the New state 206, execution of the realm activate command 208 specifying that realm's local RID triggers a transition from the New state 206 to the Active state 210 in which the realm is now executable, and after this point a realm entry into the corresponding realm will no longer trigger a fault. The realm is now fully operational. As discussed below, in some examples activation may depend on checking of a parameter signature. A subsequent realm invalidation command 212 triggered by the parent realm for a child realm in any of the Clean, New and Active states 202, 206, 210 results in a transition to the Invalid state 214. To leave the invalid state 214 and return to the Clean state 202, the parent realm has to execute a realm scrubbing command 216. The realm scrubbing command 216 is rejected if the resource count tracking the number of pages owned by the realm has a value other than zero. Hence, in order for the realm scrubbing command 216 to be successful, the parent realm first has to issue a Granule.Reclaim command for every page owned by the invalid realm. The Granule.Reclaim command specifies a target memory page and triggers invalidation of the target page to make the page inaccessible, and also reduces the reference count for the page's owner realm by one. It is not necessary to actually overwrite the data in the invalid regions when executing a Granule.Reclaim or realm scrubbing command 216, as the overwriting can be done when a Clean command is subsequently issued to transition the memory page from Invalid to Valid (see FIG. 15 discussed below). Also in response to the realm scrubbing command any cached data associated with the invalidated realm may also be invalidated, for example within the TLBs 100 or caches 110 of any of the processing elements 8, 10, 12 (not just the processing element executing the RMU command). The global RID may be used to trigger such invalidations of cached data.

Hence, by providing a managed lifecycle of the realm associated with a given realm identifier, this ensures that before the realm can return to the Clean state in which its parameters can be modified (and hence before a given realm identifier can be recycled for use by a different realm), the data associated with a previous realm which used the same realm identifier has to be scrubbed from memory and any caches, to prevent any data associated with the old realm being leaked to other realms through the reuse of the same realm identifier. When a realm is in the Clean state 202, its realm descriptor can also be cancelled by executing a realm descriptor release command 218 which enables the memory regions stored in the realm descriptor to be allocated for other purposes (at this point no scrubbing is required as the realm is already clean).

FIG. 12 shows an example of contents of an entry of the realm granule table 128 (or ownership table). Each entry corresponds to a given memory region of the memory address space. The size of a given memory region could be fixed or variable depending on implementation. The particular way in which the ownership table 128 is structured may vary significantly depending on implementation requirements, and so the particular way in which the corresponding memory region for a given entry is identified can vary (e.g. data could be stored in each entry identifying the corresponding region, or alternatively the corresponding entry may be identified at least partially based on the position of the corresponding ownership entry within the table itself). Again, FIG. 12 shows a particular example of parameters which may be specified for a given memory region but other examples could provide more information or could omit some of the types of information shown.

As shown in FIG. 12, each ownership table entry may specify, for the corresponding memory region:

The global RID identifying the owner realm for that memory region. The owner realm may be the realm which has the right to set the attributes which control which other realms are allowed to access the memory region.

A lifecycle state of the corresponding memory region used to control which RMU commands are allowed to be performed on the memory region.

A mapped address to which the memory region was mapped by the MMU 26 at the point when the memory region became owned by the owner realm. The mapped address could be a virtual address or an intermediate physical address. By specifying this address in the ownership table, this can guard against potential attempts to circumvent the security provided by the realm infrastructure by remapping the address translation tables after a realm has taken ownership of a given memory region.

A visibility attribute which specifies which realms in addition to the owner can access the memory region. For example, as shown in FIG. 13, the visibility attribute could specify a parent visibility bit which controls whether or not the parent realm of the current realm is allowed to access the region, and a global visibility bit which may specify whether any realm may access a corresponding memory region. In general, the realm protection scheme may assume that descendant realms of the current realm are always allowed to access the memory region owned by its parent or ancestor realm (subject to whether or not accesses are permitted based on the translation tables 120 which provide protection based on privilege level), but a given realm may control whether its parent or any other realm which is not a direct descendant of the given realm can access the memory region. In some embodiments both the parent and global visibility bits could be set by the owner realm itself. Alternatively, while the parent visibility bit may be set by the owner realm, the global visibility bit may be able to be set by the parent realm of the owner realm (provided that the parent visibility bit for the memory region has already been set to give the parent visibility of that memory region). It will be appreciated that this is just one example of how the owner realm could control which other processes could access its data.

Figure 15:
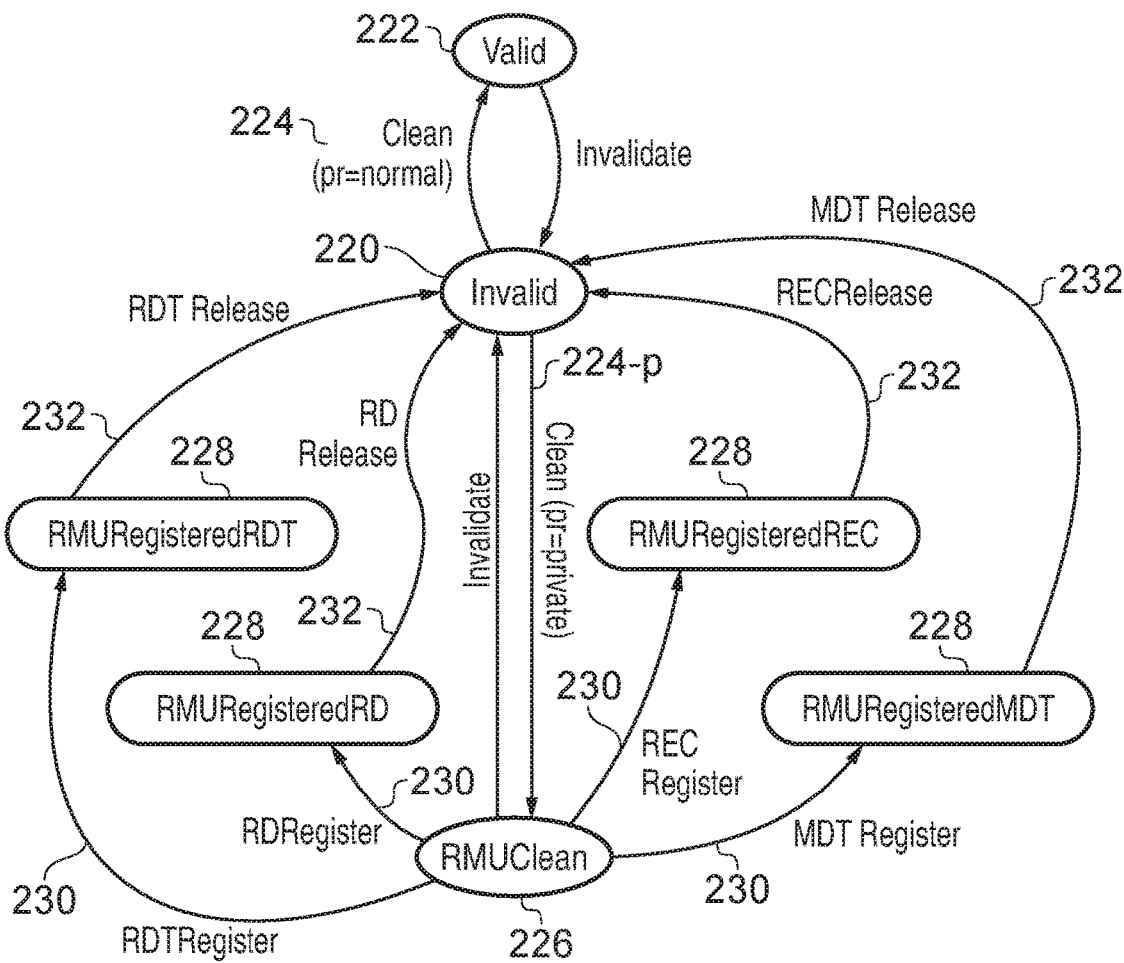
FIG. 15 is a state machine showing transitions of lifecycle state for a given memory region.

FIG. 14 is a table showing different lifecycle states in which a given memory region can exist, and FIG. 15 is a state machine showing the commands that trigger transitions between the respective lifecycle states. In a similar way to the realm lifecycle states shown in FIG. 11, the transitions between memory region lifecycle states are managed to ensure that a memory region passing from ownership by one realm to ownership of another realm must first undergo an invalidation process where data in that region is scrubbed (e.g. set to zero). Hence, in order to transition from an Invalid state 220 to a Valid state 222 in which software can access the memory region, a clean command 224 has to be executed by the RMU 20, triggered by software executing on the processing element 8. The clean command 224 identifies a particular memory region (page) and controls the RMU to step through the memory addresses of the corresponding memory region to invalidate/zero the data in each location within that memory region. The clean command is rejected (e.g. a fault is triggered) if the targeted memory region is in any state other than Invalid.

In some systems it may be sufficient to provide valid and invalid states 222, 220 as the only memory region lifecycle states. However, in the example of FIG. 15, a given memory region can also be designated as an 'RMU-private' memory region which is reserved for exclusive access by the RMU 20 itself, so that accesses to an RMU-private memory region which are triggered by software executing on the processing circuitry 32 (other than any RMU software) would be rejected. This could be useful especially for storing the realm management data such as the realm descriptors, realm descriptor tree entries, realm execution context and meta data for paging as discussed above. By providing attributes for designating a given memory region as an RMU-private memory region which is reserved for exclusive access by the RMU, this can prevent software processes, including the owner process of the memory region itself, from being able to access the realm management data which could otherwise allow software processes to circumvent the security protections provided by the realm scheme.

Hence, the clean command 224 may specify, as one of its parameters, a privacy indication specifying whether this is a normal clean command or a private clean command. Alternatively two entirely separate commands could be provided for these purposes. When the clean command is a normal clean command, this triggers the transition to the Valid state 222 as discussed above. However, when the clean command is a private clean command 224, this triggers a transition to the RMUClean state 226, in which the memory region is designated as an RMU-private memory region. In some examples all types RMU data could be stored within a single type of RMU-private memory region corresponding to the RMUClean state.

However, robustness can be improved by designating multiple types of RMU-private memory region, each corresponding to a particular form of realm management data. For example, in FIGS. 14 and 15, a number of RMURegistered states 228 are defined which each correspond to RMU private regions which are designated for a particular purpose. In this example, the RMURegistered states 228 include RMURegisteredRDT (for storing a RDTG of a realm descriptor tree), RMURegisteredRD (for storing a realm descriptor), RMURegisteredREC (for storing realm execution context data) and RMURegisteredMDT (for storing paging metadata used during export/import operations as discussed above). Different forms of registration commands 230 may be executed by the RMU for a memory region in the RMUClean state, to transition the memory region to a corresponding one of the RMURegistered states 228. A command for storing data to the an RMU-private memory region which does not correspond to the specified purpose (RDT, RD, REC or MDT) may be rejected. Hence, in a first lifecycle state of the RMURegistered states, a first type of RMU command for storing a first type of realm management data may be allowed, and in a second lifecycle state a second type of RMU command for storing a second type of realm management data may be allowed, with the first RMU command being rejected when the targeted memory region is in the second lifecycle state and the second RMU command being rejected when the targeted memory region is in the first lifecycle state. This can enable further security by avoiding a malicious parent realm for example attempting to store realm descriptor entries to a realm execution context region or vice versa in order to attempt to disrupt the operation of the child realm. From each of the RMU register states 228, a corresponding form of release command 232 may return the corresponding memory region to the Invalid state 220. A further clean command may trigger scrubbing of data from a previously defined RMU-private region before the region can be reallocated for general purpose data.

Hence, in summary, at least one RMU-private memory region may be defined which is still owned by a given owner realm, but which has an attribute specified in the ownership table which means that it is reserved for exclusive access by the RMU. In this example the attribute which control the RMU-private status is the lifecycle state specified in the corresponding entry in the ownership table, but it could also be identified in other ways. The MMU may prevent access to a given memory region by one or more software processes when the given memory region is specified as the RMU private memory region by the at least one status attribute. Hence any software-triggered access which is not triggered by the RMU itself may be rejected when it targets an RMU-private memory region. This includes preventing access to an RMU-private memory region by the owner realm itself.

One may question why it is useful to define an owner realm for an RMU-private memory region if the owner realm cannot even access the data in the memory region. For example, an alternative approach for enforcing access to data by the RMU only would be to define a special realm for the RMU, and to allocate the pages of the memory address space for storing the data to be kept private to that special RMU owner realm. However, the inventors recognized that when invalidating realms, there may be a requirement to invalidate all the control data associated with that realm, and if this control data was associated with special RMU owner realm rather than the invalidated realm, this can make scrubbing of the invalidated realm's data more complex.

In contrast, by using the RMU-private attribute, the memory regions which store the control data for a given realm are still owned by that realm, even though the owner cannot access it, which means that it is simpler to identify which memory regions need to be invalidated when that owner realm is cancelled. When a given realm is invalidated, the parent realm may simply perform a sequence of reclaim operations (e.g. by executing a reclaim command which is then acted upon by the RMU) which triggers the memory regions which were owned by the specified invalidated realm (or its descendants) to be invalidated, and made inaccessible, and returned to ownership of the parent realm which triggered the reclaim command. The reclaim operation may not only affect the pages accessible to the invalidated realm but also include the RMU-private memory regions owned by the invalidated realm.

Another advantage of storing the control data for a realm in RMU-private memory regions owned by that realm is when performing export operations. In order to reduce the memory footprint of a Realm to zero, during an export operation, the management structures associated with that Realm may be exported in addition to the normal memory. Requiring that those structures are owned by the Realm simplifies the management of this export operation.

In general any kind of realm management data could be stored in RMU-private regions, but in particular the realm management data may include any of the following: a realm descriptor defining properties of a given realm, a realm descriptor tree entry identifying a memory region storing the realm descriptor for a given realm or a further realm descriptor tree entry, realm execution context data which indicates architectural state associated with at least one thread of execution within a given realm, and temporary working data used at an intermediate point of a predetermined operation associated with a given realm.

Although generally the RMU private regions could be used for storing the specific realm control data associated with a given realm, it could also be used in order to increase security around certain other operations which are performed once a realm is active. For example, when performing the paging export or import operations discussed above where data is encrypted or decrypted, and the checks using the meta data are performed to check that the data is still valid when the data is imported again, such operations may take many cycles and such long running operations are more likely to be interrupted partway through. To avoid needing to start the operation again from the beginning, it can be desirable to allow the meta data or other temporary working data associated with such long running operations to be retained within cache/memory even when interrupted, without making such data accessible to other processes (including the owner realm itself). By temporarily designating regions of the memory system as RMU-private regions this temporary working data can be protected. Hence, as shown in FIG. 14 the page states can also include RMUExporting and RMUImporting states which can be used when this temporary working data is stored to a memory region, and when one of these states is selected then only the RMU can access that data.

Other examples of operations which may benefit from temporarily designating a corresponding memory region as RMU private can include: generation or verification of encrypted or decrypted data during the transfer of data between at least one memory region owned by the given realm and at least one memory region owned by a realm other than the given realm; a transfer of ownership of a memory region to another realm; and a destructive reclaim operation performed to make data stored in an invalidated memory region inaccessible. For example, the reclaim operation for scrubbing all the contents of a given page of the address space may be interrupted partway through and so to ensure that other processes cannot access that page until the scrubbing is complete, the page could temporarily be designated as RMU-private. In general any long latency operation performed by the RMU could benefit from having its temporary working data protected by converting the lifecycle state of some memory regions to an RMU-private state before starting the long running operation and then converting it back again when the long running operation is complete.

When a region is designated as RMU private it is reserved for access by the RMU 20 used to perform realm management operations. The realm management operations may include at least one of: creating a new realm; updating properties of an existing realm; invalidating a realm; allocating memory regions for ownership by a given realm; changing the owner realm for a given memory region; changing a state of a given memory region; updating access control information for controlling access to a given memory region in response to a command triggered by the owner realm for the given memory region; managing transitions between realms during processing of the one or more software processes; managing transfer of data associated with a given realm between a memory region owned by the given realm and a memory region owned by a different realm to the given realm; and encryption or decryption of data associated with a given realm. The RMU could be a hardware unit to perform at least a portion of the realm management operations, or could comprise the processing circuitry 32 executing realm management software to perform at least a portion of the realm management operations, or could be a combination of both.

Figure 16:
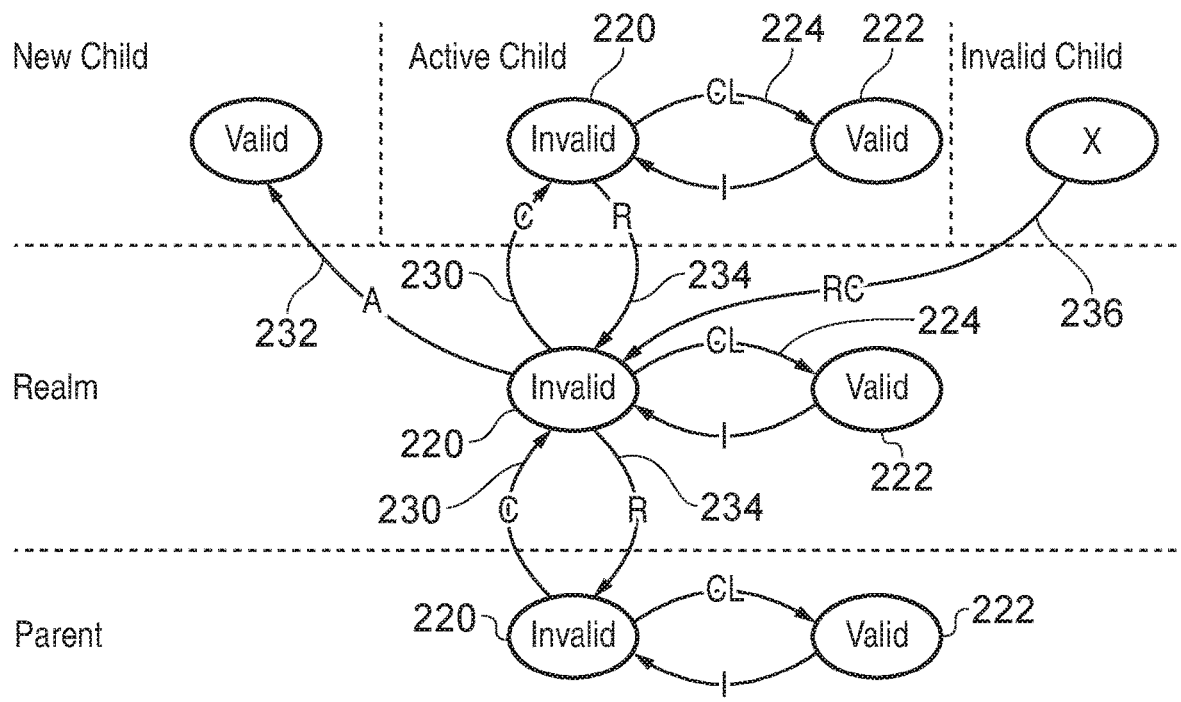
FIG. 16 illustrates how ownership of a given memory region can pass between a parent realm and its child realm.

FIG. 15 shows the state transitions which can be triggered by a given realm to clean a given page so it can be validly accessed, or invalidate the corresponding page. FIG. 16 expands this to show further commands which can be used to transfer ownership of a given page from one realm to another. Execution of a region claim command 230 by a parent realm enables the corresponding memory region to be transferred to a specified child realm if that memory region is currently in an Invalid state 220 and is owned by the parent realm. The region claim command 230 is rejected when the target memory region is owned by any realm other than the parent realm of the given child realm, or if the memory region is Valid or in one of the RMU-private lifecycle states 226, 228. This prevents the parent realm arbitrarily assigning ownership of a page which is does not itself have access to or which is in use by the RMU 20. Once the page has been assigned to the child realm, then that child realm can perform the clean command in order to transition to the valid state 222 in the same way as shown in FIG. 15. For conciseness the use of RMU-private regions is not shown in FIG. 16, but within any given realm a private clean command could alternatively transition the memory region to the RMU clean state 226 as discussed before.

A granule claim command 230 is used to transfer ownership to a child realm which has already been established. In addition, a parent realm can execute a granule add command 232 which triggers the RMU 20 to assign ownership to a new child realm in a New state so that the parent realm can write data to the region assigned to the child. For example this can be used for installing the program code of the new child realm so that the child realm can executed for the first time. Hence the add command 232 differs from the claim command 230 in terms of the lifecycle state in which the corresponding memory region is allocated to the child realm. The add command 232 may be allowed only when the child realm is in the New state 206 shown in FIG. 11. A child realm can release ownership of a given memory region back to its parent by executing a granule release command 234, which triggers the RMU to update the corresponding entry of the ownership table 128 as well as updating properties such as the resource count in the realm descriptor of the child realm etc. The granule release command 234 may be rejected if the specified memory region is not owned by the current realm which issued the command, or if the region is in a state other than Invalid (ensuring destructive cleaning of the data is required before it can be returned to ownership by the parent realm).

One advantage of using the hierarchical realm structure discussed above, where parent realms initialize child realms, is that this greatly simplifies invalidation of a realm and its descendants. It is relatively common that if a given virtual machine realm is to be invalidated, then it may also be desirable to invalidate realms for any applications running underneath that virtual machine. However, there may be a significant amount of program code, data and other control information associated with each of the processes to be invalidated. It may be desirable to ensure that such invalidations occur atomically, so that it is not possible to carry on accessing data associated with the invalidated realms when only part of the data scrubbing has been carried out. If each realm was established entirely independently of other realms, without the realm hierarchy as discussed above, this could make such atomic invalidations difficult as it may be necessary to provide a number of separate commands to separately invalidate each realm identified by a corresponding realm ID.

In contrast, by providing a realm hierarchy in which the RMU manages the realms such that each realm other than a root realm is a child realm initialized in response to a command triggered by a parent realm, then when a command requesting invalidation of a target realm is received, the RMU 20 can make the target realm and any descendant realm of the target realm inaccessible to the processing circuitry, with a more efficient operation.

In particular, in response to invalidation of the target realm, the RMU may update realm management data (e.g. the realm descriptor) associated with the target realm to indicate that the target realm is invalid, but need not update any realm management data associated with any descendant realm of the target realm. The realm management data associated with the descendant realm can remain unchanged. This is because simply invalidating the target realm may make any descendant realms effectively inaccessible even though the realm management data has not changed, because access to a given realm is controlled through its parent and so if the parent realm is invalidated then this means it is also not possible to access the parent realm's descendants. As each of the realms is entered using a realm entry instruction (ERET instruction discussed below) which uses the local RID defined by the parent realm to identify its particular child, and this is used to step through the realm descriptors which are stored in memory regions owned by the parent realm of the given child realm, then no process other than the parent realm can trigger the RMU to access the child realm's realm management data. Hence, if the parent realm is invalidated then the RMU cannot access the realm management data of the given child realm, ensuring that the given child realm becomes inaccessible.

After a realm has been invalidated, the parent realm of that realm may trigger the RMU to perform a reclaim operation for reclaiming each memory region owned by the invalidated target realm. For example as shown in FIG. 16, a reclaim command 236 for a memory region owned by a child realm may trigger a return of the memory region to the Invalid state 220 and also transfer ownership of the memory region back to the parent realm. However this reclaim operation can be performed in the background of ongoing processing of other realms and need not be performed instantly in order to allow any descendant realms of the invalidated realm to be made inaccessible. A single action to change a realm state of a given realm from Active to Invalid as shown in FIG. 11 is enough to make sure that all the data associated with any descendant realm of that invalidated realm is also inaccessible. Since any parent realm can only assign pages which it owns to its children, and the child can only assign pages which it owns to a grandchild realm, this also means that tracking which pages need to be invalidated and reclaimed upon invalidation of a given realm is relatively straightforward, since the protected address range defined in the realm descriptor of the invalidated realm (see FIG. 16) can be used to identify which pages to reclaim, since any further descendant realms of the invalidated realms will also own pages within that range.

Hence, in summary using a realm hierarchy greatly simplifies management of realms and invalidations. On such invalidations, as well as overwriting data in memory, the invalidation may also trigger invalidation of cached realm management data for the target realm and any descendant realm of the target realm held not only in the processing element 8 which triggered the invalidation, but also in other processing elements, such as another CPU or GPU. Hence there may be a broadcast of the invalidation to other processing elements, to ensure that other processing elements do not continue to have access the invalidated realms. When triggering such invalidations, it can be useful for the cached realm management data to be associated with a global realm identifier which identifies the corresponding realm uniquely, and to form the global realm identifier as discussed above so that the global RID of a given child realm shares a common prefix portion with a global RID of its parent realm. This enables bit masking or other similar operations to be used to compare quickly whether a given realm is a descendant of a specified realm ID. If a given realm is made inaccessible through invalidation of an ancestor realm, then an attempt to enter the specified target realm is not possible (as there is no parent realm to execute an ERET instruction for that realm), but even in other implementations which use a different realm entry mechanism, a realm entry could fail and trigger a fault condition if the realm descriptor of the descendant realm is no longer locatable.

FIG. 17A shows an example of checks performed by the MMU 26 and RMU 20 for determining whether a given memory access is permitted. The MMU 26 supports two stages of address translation, stage 1 translating a virtual address (VA) to an intermediate physical address (IPA) under control of stage 1 page tables 120-1 which are set by a given guest operating system, and a stage 2 address translation translating the intermediate physical address provided by the stage 1 translation into a physical address (PA) used to access memory 16 based on stage 2 page tables 120-2 which are set by the hypervisor 38. The hypervisor may define multiple sets of stage 2 page tables for different virtual machines, and a virtual machine ID (VMID) 250 provided with the memory access request may identify which particular stage 2 page tables to use. Similarly, the operating system may define multiple sets of stage 1 page tables for different applications and an address space identifier (ASID) 252 may be used to identify which stage 1 page tables to use. The VMID and ASID 250, 252 may collectively be referred to as a translation context identifier 254 which identifies a current translation context associated with the memory access request. The memory access request also specifies various attributes 256, such as attributes indicating whether the transaction is a read (R) or write (W) request, or indicating an exception level (X) associated with the process which issued the memory access request.

On receipt of a memory access, the MMU 26 may determine based on the information from the stage 1 page tables whether the transaction attributes are valid. For example the stage 1 page tables could specify that only read transactions may be allowed for certain addresses, or could permit both read and write accesses to a given address (some implementations may also permit write only regions of the address space to be defined). Also, the attributes in the stage 1 page tables could limit access to processes operating at a given exception level or higher. If the transaction attributes are valid and the access is permitted by the stage 1 page tables, then the MMU may return the corresponding intermediate physical address (IPA). The IPA together with the VMID 250 then indexes into stage 2 page tables which again validate the attributes of the transaction and, if valid, return a physical address. Note that not all transactions need to undergo two stages of address translation. For example if the input memory transaction was issued at EL3 or EL2, or at ED or EL0 in the secure domain, then the output of the stage 1 MMU may be treated as a physical address and the stage 2 MMU could be bypassed.

Having obtained the physical address, the physical address can then be looked up in the RMU tables 128 (Realm Granule Table) to determine whether the realm protections enforced by the MMU allow the memory access to proceed. The realm checks are discussed in more detail in FIG. 18 below. If the RMU checks at stage 3 succeed, then the validated physical address is output and the memory access is allowed to proceed. If any of the checks at stage 1 or stage 2 address translations or the RMU enforced realm protection provided at stage 3 fails, then the memory access is rejected. Hence the protections provided by the realm management unit can be seen as an additional layer of checks to be performed, in addition to any existing address translation checks based on page tables 120. The checks shown in FIG. 17A can be relatively slow to perform as there may be a number of tables in memory which need to be accessed and compared with parameters of the memory access request or the current translation context or realm from which the access was made. While it would be possible to perform these checks on every memory access, it can be faster to cache data within the TLBs 100 when the checks have been performed successfully for a given memory access request so that the next time a similar memory access request is issued then it can be allowed without repeating all the checks again. Hence, it may be desirable to perform these permission checks only when there is a miss in the TLB 100, and not for a hit.

FIG. 17B shows an example of a TLB structure 100 for caching data relating to already validated memory accesses. While FIG. 17B shows a single TLB, it will be appreciated that some systems may include multiple levels of TLB in a cache hierarchy, with a level 1 TLB storing a smaller subset of translation entries for faster access, and level 2 or further level TLBs storing a larger set of translation entries which can be accessed if there is a miss in the level 1 TLB. The TLB 100 (or "translation cache") has a number of entries 260, each entry specifying address translation data for a corresponding memory region. Each entry 260 includes a virtually addressed tag 262 corresponding to the virtual address for which the data provides the corresponding physical address 264. In this example, the TLB is a combined stage 1 and stage 2 TLB so that the virtual address can be translated directly to a physical address using the TLB without having to go via an intermediate physical address (although corresponding stage 1 and stage 2 translations would be performed on a TLB miss in order to locate the correct physical address, the TLB does not need to store the intervening IPA and can map the VA direct to a OA). Other examples could use split stage 1 (S1) and stage 2 (S2) TLBs, in which case the VA-PA pair 262, 264 can be replaced with a VA-IPA pair or IPA-PA pair. The TLB entries 260 are also tagged with the translation context identifier 254 (formed of the ASID 252 and VMID 250). Although this example provides two separate translation context identifiers, in other examples a single unified translation context identifier could be used, or in the case of split S1/S2 TLBs, the S1 TLB could use the ASID and the S2 TLB could use the VMID. The translation context identifier allows different operating systems or applications which specify the same virtual address to have their accesses mapped onto different entries of the TLB 100 which provide different physical addresses.

A hit in the TLB 100 requires not only the tag 262 to match a corresponding portion of the address 258 specified for the memory access request, but also the translation context identifiers stored in the same entry should match the current translation context from which the memory access was issued. It may be expected that the comparison of the tag 262 and the translation context identifiers 254 may be enough to locate the correct physical address 264 for a given memory access. However, if these are the only comparisons performed in the lookup, there is a potential security vulnerability if memory accesses hitting in the TLB are accepted without a further check of the realm management unit tables 128. This is because it is possible for a new process to be created which has the same VMID 250 or ASID 252 as a previously executed process, to trick the MMU into accepting a memory access which actually comes from a different realm to the one that was previously accepted for accessing a given memory region.

To address this problem, the TLB 100 may specify within each TLB entry 260 the global RID 270 of the owner realm which owns the corresponding memory region, as well as visibility attributes 272 set by the owner realm for controlling which other realms are allowed to access the corresponding memory region. When a given lookup of the translation cache 100 is performed in response to a memory access to a given target memory region issued from a current translation context and a current realm, if there is a miss in the translation cache 100, TLB control circuitry 280 may trigger the table walk unit 102 to access the relevant page tables 120 and RMU tables 128 in order to check whether the access is allowed. If either the page tables or the RMU tables 128 exclude the current combination of the translation context, exception level and realm from accessing the corresponding memory region, then no data is allocated to the translation cache in response to that memory access. In particular, when the lookup misses and the current realm is excluded from accessing the target memory region by an owner realm of the target memory region, then allocation of address translation data to the translation cache is prevented. Hence, an entry is allocated to the TLB 100 when the corresponding memory access passes the checks of both the MMU page tables 120 and the RMU tables 128.

Subsequently, when looking up the translation cache to check whether it already includes an entry 260 which provides the address translation for a given address, the TLB control circuitry 280 determines whether the memory access matches a given entry of the translation cache 100 in dependence upon a first comparison between the translation context identifier 254 specified in the corresponding entry 260 and the translation context identifier 254 for the current translation context which was received along with the memory access request, and also a second comparison between the global RID 270 specified by that entry 260 and a current global RID associated with the current realm which issued the memory access request. By providing an additional check that the TLB entry is still being accessed from a realm previously verified as allowed to access the memory region, this ensures that even if a malicious supervising process regenerates another process with the same ASID 252 or VMID 250 as a previously existing process which was permitted to access the data by the owner realm, since the global realm identifiers 270 cannot be reallocated to other processors without undergoing the realm scrubbing command 216 as discussed with respect to FIG. 18, this means that the current realm's global RID can be trusted as valid and cannot be "faked" as is possible for the ASID or VMID. Therefore, if the global RID of the current realm still satisfies the permissions indicated by the owner GRID 270 and the visibility attributes 272, then this indicates that the previously performed realm table checks are still valid.

If the second comparison of the realm identifier detects a mismatch, then the access request is considered to miss in the TLB even if the tag comparison and translation context comparison match, as it indicates there has been a change in the mapping between the translation context IDs 254 and the realm IDs 270 since the entry was allocated. This does not necessarily imply that the access will be rejected, as another walk of the page tables and RMU tables may be triggered by the table walk unit 102, and if the realm checks are successful this may lead to allocation of a different entry 260 in the TLB 100 and servicing of the memory access based on the information from the newly allocated entry.

FIG. 18 is a flow diagram illustrating a method of determining whether a given memory access is permitted by the MMU 26. At step 300 a memory access request is received and this is looked up in the TLB 100. The memory access request specifies at least a virtual address to be accessed, one or more translation context identifiers indicating a current translation context and a global realm identifier identifying the current realm. For example the global RID may be read from a state register of the processing element 8 which may be written with the global RID of the current realm on entry into the realm.

In response to the memory access request, the TLB control circuitry 280 performs a lookup of the TLB. The lookup accesses at least some entries of the TLB. Some approaches may use a fully associative cache structure, and in this case all the entries of at least a level 1 TLB may be searched and compared with the parameters of the current request in order to identify whether there is a hit or a miss. Other approaches may use a set-associative cache allocation policy and in this case only a subset of the entries of a given level of TLB may need to be looked up, indexed using the target address of the memory access. For each of the accessed set of entries, the TLB control circuitry 280 performs a number of comparisons (either in parallel or sequentially), including:

a tag comparison 302 for comparing whether the address of the memory access request matches the tag 262 stored in the accessed entry;

a first (context) comparison 304 for comparing translation context identifiers stored in the accessed entry with the translation context identifier of the memory access request; and a second (realm) comparison 306 for comparing the global RID of the memory access request against the owner RID 270 and the visibility attributes 272 for each of the accessed set of entries.

At step 308 the control circuitry 280 determines whether there is an entry in the TLB which returned matches for all of the comparisons 302, 304, 306, and if so then a hit is identified and at step 310 the physical address 264 specified in the matching entry is returned and the memory access is allowed to proceed based on that physical address. In the case of a hit, there is no need to perform any lookup of the page tables or the RMU tables (an ownership table lookup for the memory access can be omitted). The protections provided by the page tables and RMU tables are invoked only on a miss.

It there is no entry which matches all three of the comparisons 302, 304, 306, then a miss is detected. If a further TLB level is provided, a corresponding lookup to steps 300-308 can be performed in a level 2 or subsequent level TLB. If the lookup misses in the last level TLB, then a walk of the various page tables and RMU tables is performed. Hence, at step 311 a stage 1 page table walk is performed and at step 312 it is determined whether a stage 1 page table fault has occurred (e.g. because there was no address mapping defined for the specified virtual address or because the current parameters of the access request violate the access permission specified for the targeted virtual address). If a stage 1 fault occurs then at step 314 the memory access is rejected and allocation of address mapping data to the TLB 100 in response the memory access is prevented.

On the other hand, if the access request passed the stage 1 page table checks, then at step 315 a stage 2 page table walk is triggered to obtain mapping data for the intermediate physical address returned by the stage 1 process, and at step 316 it is determined whether a stage 2 page table fault has occurred (again, because the address mapping was not defined or because the access is not permitted by the stage 2 access permissions). If a stage 2 fault occurs then again at step 314 the access request is rejected.

If no stage 2 fault occurs then at step 318 the RMU table lookup is triggered based on the physical address returned by stage 2 and at step 320 it is determined if a realm fault has been detected. A realm fault may be triggered if any of the following events occurs:

If the lifecycle state for the corresponding memory region is indicated as Invalid in the realm ownership table 128. This ensures that a page of the memory address space which has not undergone the cleaning operation 224 shown in FIG. 15 cannot be accessed, to protect any data previously stored by another realm in that memory region from access by a different realm.

The current realm is not permitted by the owner realm for the corresponding memory region to access that memory region. There could be a number of reasons why a given realm may not be allowed to access a given memory region. If the owner realm has specified that the memory region is visible only to the owner itself and its descendants, then another realm may not be allowed to access that region. Also if the current realm is the parent realm of the owner realm and the owner realm has not defined the parent visibility attributes to permit the parent to access the region, then the memory access may be rejected. Also, the owner realm itself may be prevented from accessing a memory region if that memory region is currently set as RMU-private as discussed above. At the RMU checking stage, a descendant realm of the owner realm may be permitted to access the memory region (as long as the memory region is not an RMU-private region). Hence, this check enforces the access permissions set by the owner realm.

If the virtual address or intermediate physical address from which the physical address was mapped for the current memory access by the S1/S2 translations does not match the mapped address specified in the ownership table 128 for the corresponding memory region as shown in FIG. 12, then the memory access is rejected. This protects against situations where a malicious parent realm could allocate ownership of a given memory region to a child realm, but then change the translation mappings in the page tables 120 so that a subsequent memory access triggered by the child realm using the same virtual address it previously used to refer to a page owned by that child realm now maps to a different physical address which is not actually owned by the child realm itself. By providing a reverse mapping in the ownership table from the physical address of the corresponding memory region back to the mapped address used to generate that physical address at the time the ownership was claimed, this allows security breaches caused by changes of address mappings to be detected so that the memory access will fail.

It will be appreciated that other types of checks could also be performed. If the realm checks are successful, at step 322 the physical address is returned, the memory access is allowed to proceed using the physical address, and a new entry is allocated to the TLB indicating the physical address obtained from the page tables 120 and the owner realm and visibility attributes obtained from the ownership table 128 corresponding to the requested virtual address and translation context.

On entry and exit to or from a realm, the processing element 8 and/or RMU 20 may need to perform a number of operations for ensuring secure handling of the realm entry or exit. For example, on entry to a realm a number of checks may need to be performed to check that the target realm is in the correct life cycle state (to avoid security measures being circumvented by attempting to enter a non-existent realm or a realm which has not undergone scrubbing of data from its owned pages, for example). Also, on exiting a realm, it may be desirable to mask the architectural state stored in registers of the processing element so that a higher privilege level process cannot access the state data used by the realm at a lower privilege level (which would otherwise enable the security measures provided by the realm protection to be circumvented). One approach for handling realm entry and exit could be to provide a dedicated realm entry or a realm exit instruction which triggers the RMU 20 to perform the relevant operations for entering or exiting a realm.

Another approach can be to re-use mechanisms already provided for exception entry and return in order to enter and exit from realms. This reduces the amount of software modification required to support realm entry and exit, and simplifies the architecture and hardware. This is particularly useful because often the realm boundaries may correspond to exception level boundaries anyway, and even if a new instruction was provided to control entry and exit, a behavior for handling exceptions would still be required, so overall it can be less costly to extend the exception mechanisms to also control entry and exit.

Hence, an exception return (ERET) instruction, which would normally return processing from an exception processed in a current realm to another process also processed in the current realm (where the other process could be handled at the same exception level or a less privileged exception level than the exception), may be re-used to trigger realm entry from a current realm to a destination realm. In response to a first variant of the exception return instruction, the processing circuitry may switch processing from a current exception level to a less privileged exception level (without changing realm), while in response to a second variant of the exception return instruction, the processing circuitry may switch processing from a current realm to a destination realm, which could be operating at the same exception level or a lower (less privileged) exception level as the current realm. Using an exception return instruction to trigger realm entry can greatly simplify the architecture and hardware overhead as well as reducing software modification requirements to support use of the realms.

Another advantage of using an exception return instruction is that typically on returning from an exception, the processing circuitry may perform an atomic set of operations in response to an exception return instruction. The set of operations required on returning from an exception may be performed atomically so that these operations cannot be divided partway through, and so either the instruction fails and none of the atomic set of operations are performed or the instruction is successfully executed and all of the atomic set of operations are performed. For the second variant of the exception return instruction, the processing circuitry may similarly perform a second atomic set of operations, which may be different to the first atomic set of operations. The mechanisms already provided in a processor for ensuring that the exception return instruction completes atomically can be re-used for realm entry in order to avoid a situation where the realm entry may only have partially have been performed which could lead to security vulnerabilities. For example the second atomic set of operations could include making realm execution context states available, changing the current realm being executed, and controlling branching to a program counter address at which processing was previously being executed when the last time the same realm was executed.

The first and second variants of the exception return instruction may have the same instruction encoding. Hence, no modification of the exception return instruction itself is necessary in order to trigger the realm entry. This improves compatibility with legacy code. Whether a given exception return instruction is executed as the first variant or the second variant may depend on a control value it stored in a status register (e.g. first and second values of the control value may represent the first and second variants of the exception return instruction respectively). Hence, the current architectural state at the time that the exception return instruction is executed controls whether it returns the processor to a lower privilege level in the same realm, or triggers entry into a new realm.

This approach enables realm entry to be controlled with less software modification, especially as the value in the status register could be set automatically by hardware in response to certain events implying that a realm switch is likely (in addition to allowing voluntary setting of the control value in response to software instructions). For example, when an exception condition occurs which triggers an exit to a given realm, the processing circuitry could set the control value to the second value for the given realm so that a subsequent exception return instruction will automatically return processing to the realm in which the exception occurred, even if the exception handler code for handling the exception is identical to previous legacy code which was not written with realms in mind. Alternatively, in some architectures it may be expected that, when exiting from a realm the control value in the status register will still contain the second value which was set before triggering a realm entry to that realm, and so no explicit setting of the control value in the status register may be required.

At least one realm identifier register may be provided, and in response to the second variant of the exception return instruction the processing circuitry may identify the destination realm from a realm identifier stored in the realm identifier register. The realm identifier register may be banked, so that there are multiple realm identifier registers each associated with one of the exception levels, and in response to the second variant of the exception return instruction, the processing circuitry may identify the destination realm from the realm identifier stored in the realm identifier register associated with a current exception level. By using a realm identifier register to store the target realm identifier, there is no need to include this in the instruction encoding of the ERET instruction, which enables an existing format of ERET instruction to be used to trigger realm entry, reducing the amount of software modification required. The realm identifier in the realm identifier register may be a local realm identifier used by a parent realm to refer to its child realms, and so realm entry may be restricted to passing from a parent realm to a child realm, and it is not possible to go from a first realm to another realm which is not a direct child of the first realm. In response to the second variant of the exception return instruction, the processing circuitry may trigger a fault condition when a realm associated with the realm ID identified in the RID register is an invalid realm (a RID for which no realm descriptor has been defined or for which the realm descriptor defines a lifecycle state other than Active).

In response to the second variant of the exception return instruction the processing circuitry may restore architectural state associated with a thread to be processed in the destination realm from a realm execution context (REC) memory region specified for the exception return instruction. The state restoration can be performed immediately in response to the second variant of the exception return instruction (e.g. as part of the atomic set of operations), or could be performed later. For example the state restoration can be performed in a lazy manner so that the state required to commence processing in the destination realm could be restored right away (e.g. the program counter, processing mode information, etc.), but other state, such as general purpose registers, could be restored when required at a later time, or gradually in the background of ongoing processing of the new realm. Hence, the processing circuitry may commence processing of the destination realm before all the required architectural state has been restored from the REC memory region.

In response to the first variant of the exception return instruction the processing circuitry may branch to a program instruction address stored in a link register. In contrast, for the second variant of the exception return instruction, the processing circuitry may branch to a program instruction address specified in the realm execution context (REC) memory region. As the link register would not be used for the second variant of the exception return instruction to directly identify any architectural state for the new realm, the link register can be re-used to instead provide the pointer to the REC memory region from which the new realm's architectural state is to be restored. This avoids the need to provide a further register in order for storing the REC pointer.

Hence, before executing an exception return instruction intended to cause a realm entry to a given realm, some additional instructions can be included in order to set the RID register to the realm identifier of the destination realm and to set the link register to store a pointer of a REC memory region associated with the destination realm. The REC pointer can be obtained by the parent realm from the realm descriptor of the destination realm.

In response to the second variant of the exception return instruction, a fault condition may be triggered by the processing circuitry when either the REC memory region is associated with an owner realm other than the destination realm or the REC memory region specified for the exception return instruction is invalid. The first check prevents a parent realm tricking a child realm into executing with processor state which it did not itself create, since only the memory regions owned by the child realm can store REC memory regions accessible on entering that realm (and as discussed above the REC memory regions will be set as RMU private). The second check of the validity of the REC memory region can be useful for ensuring that a REC memory region can be used only once to enter the realm and after that a subsequent attempt to enter the realm with the same REC data would be rejected. For example, each REC may have a life cycle state which may be either invalid or valid. In response to an exception occurring during processing of a given thread in a current realm, the architectural state of that thread may be saved to a corresponding REC memory region and that corresponding REC memory region may then transition from invalid to valid. In response to successful execution of the second variant of the exception return instruction, the REC memory region may then transition back from valid to invalid. This avoids a parent realm maliciously causing a child realm to behave incorrectly by specifying a pointer of an out of date REC memory region, a REC memory region associated with a different thread, or some other REC which is associated with a destination realm but is not the correct one that was used to store the architectural state upon a previous exit from the realm.

In a corresponding way, exit from a realm may re-use mechanisms provided for exception handling. Hence in response to an exception condition occurring during processing of a first realm which is unable to be handled by the first realm, the processing circuitry may trigger a realm exit to a parent realm that initialised the first realm. On exception occurrence/realm exit, some additional operations may be performed which would not be performed for an exception occurring which can be handled within the same realm. For example this may include masking or scrubbing of architectural state and triggering of state storage to the REC.

However, in some cases an exception may occur which cannot be handled by the parent realm of the first realm in which the exception occurred. Hence in this case it may be necessary to switch to a further ancestor realm beyond the parent. Although it might be possible to provide the ability to directly switch from a given realm to an ancestor realm which is more than one generation older, this may increase the complexity of the state registers required for handling exception entry and return or realm exit and entry.

Instead, a nested realm exit may be performed when the exception condition is to be processed at a target exception level with a greater privilege level than a most privileged exception level at which the parent realm of the first realm is allowed to be processed. The nested realm exit may include two or more successive realm exits from child realm to parent realm, until a second realm is reached that is allowed to be processed at the target exception level of the exception that occurred. Hence, by stepping up the realm hierarchy one level at a time, this can simplify the architecture. At each successive realm exit there may be operations performed to save a subset of processor state to the REC associated with the corresponding realm.

FIG. 19 illustrates the concept of sub-realms which can be initialized by a parent realm. As shown in FIG. 19, a given parent realm 600 operating at a particular exception level may initialize a sub-realm 602 which operates at the same exception level as its parent. The full realm 600 corresponds to a given software process (or collection of two or more processes) but the sub-realm corresponds to a predetermined address range within the given software process. As the full realm is the parent of the sub-realm, then as discussed above the sub-realm may have a right to access data stored in memory regions owned by the parent full realm, but the sub-realm may have a right to exclude its parent full realm from accessing data stored in a memory region owned by the sub-realm 602. This is useful for allowing a certain portion of a given software process to be made more secure than other parts of the software process. For example a portion of code for checking passwords in a mobile banking application or for processing other sensitive information could be allocated to a sub-realm in order to prevent other portions of the same application or operating system from accessing that sensitive information.

Sub-realms may generally be handled in the same way as full realms, with some differences as explained below. Entry and exit to and from sub-realms may be handled using exception return instructions and exception events in the same way as discussed above. Hence, the sub-realm may have a child realm ID constructed in the same way as for full child realms of the same parent, and may be provided with a realm descriptor within the realm descriptor tree as discussed above. Entry to the sub-realm can be triggered simply by executing the ERET instruction having placed the appropriate child sub-realms RID in the RID register before executing the ERET instruction. Hence, the same type of ERET instruction (of the second variant) can be used to trigger entry to either a full realm or a sub-realm.

One way in which sub-realms may be different to full realms may be that sub-realms may not be allowed to initialize their own child realms. Hence a realm initialization command for initializing a new realm may be rejected if the current realm is a sub-realm. The RMU may determine whether the current realm is a full realm or a sub-realm using the realm type value in the realm descriptor of the current realm. By disabling realm initialization when currently in a sub-realm, this simplifies the architecture since it is not necessary to provide additional state registers for use by the sub-realm in initializing further realms.

Similarly, execution of a realm entry instruction may be disabled when currently in a sub-realm. This simplifies the architecture because it means that banked registers which are duplicated for different exception states for handling realm entry and exit (and exception entry and return) do not need to be banked a further time for each sub-realm, which would be difficult to manage as it may not be known at design time how many sub-realms a given process will create. Similarly, exception return events which trigger a switch to a process operating at a lower privilege level may be disabled when a current realm is a sub-realm rather than a full realm. Although in the examples discussed above a single type of ERET instruction functions both as a realm entry instruction and an exception return instruction, this is not essential for all embodiments, and in cases where separate instructions are provided, then both the realm entry instruction and the exception return instruction could be disabled when the current realm is a sub-realm.

Similarly, on occurrence of an exception when in a sub-realm, rather than taking the exception from directly from the sub-realm, the processing circuitry may trigger an exit from the sub-realm to a parent full realm which initialized the sub-realm, before handling the exception. Hence, exceptions trigger a return to the parent full realm. The exception return to the parent full realm may include the state masking, scrubbing and saving operations to the REC, but by avoiding exceptions being taken directly from a sub-realm to a realm at a higher exception level, this avoids the need to bank exception control registers a further time for sub-realms, simplifying the architecture.

For a sub-realm, the boundary exception level, which indicates the maximum privilege level allowed for processing of the realm, is equal to the boundary exception level for its parent full realm. In contrast, for a child full realm the boundary exception level is a less privileged exception level than the boundary exception level of its parent realm.

When a realm is initialized by a parent realm, the parent realm may choose whether the new realm is to be a child full realm or a child sub-realm, and may set the appropriate realm type parameter in the realm descriptor accordingly. Once the realm is operational, the parent realm can no longer change the realm type, because modification of the realm descriptor is disabled through the managed realm lifecycle discussed above with respect to FIG. 11.

In summary, the ability to introduce sub-realms, which are managed similar to full realms but with exception handling, realm initialization and realm entry functionality disabled within the sub-realm, enables a smaller portion of code corresponding to a given address range within the software process of a full realm to be isolated from other parts of that software, to provide additional security for a certain piece of sensitive code or data.

Parameter Signing

The access control model described above protects a realm from any other agents on the system, including other software at the same privilege level, other software at higher privilege levels, and other realms. When creating a realm, it is populated with content (memory pages) representing the initial content of the realm. The initial content is measured. The realm is also assigned a security configuration such as whether the realm is started in debug mode or not, scope parameters for derivation of realm secrets typically used by the realm to protect its own internal boot process and to keep its data private, and so on. The process of creating a realm, measuring it, and enforcing its security configuration (including derivation of realm secrets), is managed by the realm management unit.

Once a realm is up and running, some outside user (for example, a client connecting to a server application running inside a realm) can connect to the realm and request an attestation report. The attestation report allows the outside user to verify that the realm is running on a trustworthy system, and was initially populated with expected software (the realm measurement), and that the realm was configured as expected (for example, not started with debug enabled). This may be useful for applications where data is only provisioned or made available following successful attestation.

However, providing attestations after the realm is up and running may not be enough for the following example use cases:
- where data needs to be stored persistently on a system such that it remains available following restart of a realm, or a system,
- if data needs to be made available to multiple instances of "the same" realm for load balancing, redundancy, etc.
- if the realm needs access to some boot secrets before it has been attested, for example access to boot images stored in a protected file system. Including following restart of "the same" realm, or a system.

Here, "the same" realm means one or more realm instances populated with the same initial content, and using the same security configuration.

These issues can be addressed by introducing the concept of signed realm parameters. The security configuration of the realm is extended to include an expected measurement. The security configuration of the realm is signed by a parameter signer. The parameter signer identity is included together with the signature. For example, using asymmetric cryptography, the parameters may be signed using a private key owned by the parameter signer, and a hash of the corresponding public key may be used as the parameter signer identity.

The rules for creating a realm are extended such that if signed parameters are used, the signature of the actual security configuration must match the expected signature before the realm can be activated, and the signer ID is included in key derivations for deriving realm secrets. These rules are enforced by the realm management unit 20 and cannot be circumvented by software.

This means a realm can only be activated, and access its secrets, if: (i) its security configuration has been signed correctly, and (ii) the signer is the correct entity. If either of these two conditions are not met, then either the realm will not start, or it will start but cannot access its secrets.

For example, FIG. 20 shows an example of using such parameter signatures to verify whether, on activation of a given realm, the realm's security configuration parameters have been set as expected by the party requesting that the realm was installed on a given hardware platform.

As shown at the top of FIG. 20, when a realm is created, the party requiring use of the realm requests a parent realm to initiate the target realm and establish the target realm with a certain set of realm security configuration parameters 400. For example the initial realm parameters may be specified in commands sent to the parent realm by some external party such as a banking provider, healthcare provider or other party who wishes the hardware part to install a secure realm for interaction with that provider. It may be expected that the initial set of realm security configuration parameters 400 will be added to the target realm's realm descriptor by the parent realm, using realm parameter update commands.

For example, the initial realm parameters may include some of the contents of the realm descriptor described above, such as the realm type 402, as well as other security configuration parameters such as an indication 406 of whether export of data from a first memory 16 (subject to the realm ownership protections) to a second external memory 6 is enabled, or an indication 408 of whether debugging is enabled for the realm. Other realm security configuration parameters, such as the protected address range, and the key material for deriving root keys, may not be included in the initial set of parameters given to the parent realm, but instead may be generated by the RMU on creation of the realm, provided to the realm by a trusted intermediary realm as discussed below, or generated by the realm itself.

The initial realm parameters 400 also include an expected signature 410 which corresponds to a signature of a subset of the security configuration parameters expected to be established for the realm. The expected signature 410 is computed by a parameter signer (e.g. the party requesting installation of the realm) based on the expected security configuration parameters, and given to the parent realm along with the security configuration parameters for the realm being created. The initial realm parameters also include an indication of a signer ID 412 which identifies the parameter signer. The expected signature 410 and signed ID 412 may be recorded in the realm descriptor for the target realm by the parent realm when configuring the target realm while the target realm is in the Clean state.

For example, the expected signature 410 may be generated by the parameter signer by generating a hash value based on a hash function of the expected realm parameters, and encrypting the hash function using a private key associated with the parameter signer. The signer ID 412 may be a public key of the parameter signer which corresponds to the private key used to generate the signature 410 in an asymmetric cryptography scheme.

The expected signature 410 may not only be computed over a subset of the expected realm security configuration parameters themselves, but also based on a measurement value which may be calculated as a function of the expected realm content (data and code) which is expected to be stored in the memory regions owned by the target realm at the point when the realm is activated.

The expected signature 410 may not cover all of the realm's security configuration parameters. Some security configuration parameters which will be set in the realm descriptor for a given realm may be excluded from the computation of the expected signature 410. These could include the expected signature itself 410 and the signer ID 412. Also, some of the realm's parameters in the realm descriptor may depend on local features of the particular physical platform, rather than on security configuration settings expected by the external party needing the realm to be created. For example, the particular addresses defined for the protected address range, may depend on the particular address mapping established for the realm on a given physical instance, or some hardware instance unique keys may be generated by the RMU 20 of a particular physical instance, so may not be predictable by the parameter signer, and so may not be subject to the parameter signing.

At the time of activating a target realm to make it available for processing by the processing circuitry, the RMU 20 verifies the actual realm parameters 420 represented in the realm descriptor of the target realm based on the expected signature 410 provided by the parameter signer at realm creation. At this point the RMU determines a parameter signature 422 as a function of (i) a subset of the realm's actual security configuration parameters 420 (again, excluding certain parameters as discussed above), and (ii) a measurement 421 of the actual realm content of the memory regions owned by the target realm. For example, a certain hash function 424 may be applied to the realm security configuration parameters 420 and the measurement value 421 to generate the parameter signature 422. The hash function 424 may correspond to the hash function which was used by the parameter signer to generate the expected signature 410 based on the expected realm parameters and expected realm content.

The RMU 20 also obtains the expected signature 410 and signer ID 412 from the target realm's realm descriptor, and verifies whether the expected signature 410 and the parameter signature 424 match. For example, if the expected signature 410 was computed by the parameter signer by encrypting the expected parameters using a private key, then the RMU 10 may decrypt the expected signature 410 using the signer's public key as represented by the signer ID 412, and then compare the decrypted signature with the parameter signature 422 generated from the actual realm parameters. Alternatively, other cryptographic techniques are possible for verifying whether a parameter signature 422 derived from the actual parameters 420 matches an expected signature.

In general, if a match is detected between the actual parameter signature 422 derived from the security configuration parameters 420 and the expected signature 410 provided at creation of the realm, then the activation of the target realm is allowed to proceed (assuming any other security checks are satisfied). On the other hand, if a mismatch is detected between the parameter signature 422 and the expected signature 410 then activation is restricted, either by generating a fault so that the realm is not allowed to be activated at all, or by permitting activation of the realm but denying access to the secret keys for protecting the realm contents which may prevent the realm from functioning correctly. Either way, by using the signature verification, the RMU can enforce that the actual parameters at the time of realm activation match the expected parameters which the parameters sign that expected should be installed by the realm, to police against the parent realm maliciously changing the realm parameters from those given to it by the party requesting the installation of the realm.

The signer ID 412 is also included in key material for deriving realm secrets for the target realm. This means that if a given realm is established and its realm parameters are verified as authentic based on a signature provided by the wrong signer, then although that realm may be activated it will not have the correct keys for accessing data that is protected by keys associated with the correct signer.

This approach of using parameter signatures is relatively unusual since normally a cryptographic signature would be used to verify that the identity of a party providing some information matches some known identity. However in the scenario shown in FIG. 20 the actual identity of the party requesting realm creation is not verified against any known identity. In practice any party may be allowed to request the creation of a given realm and enable its realm to be activated if the expected signature given at realm creation matches the actual signature generated from the actual parameters at the time of realm activation. Hence, if an attacker provides a different signature from the one expected and the actual parameters are set up in a way that matches that different signature, the realm will be allowed to be activated. However, the inclusion of the signer's public key in the key material for the realm guards against the realm configured by the attacker being allowed to access data protected by the true parameter signer, so security is still enforced. The purpose of the signature checking is not for verifying the identity of the party requesting the installation of the realm, but rather to check that (whoever has requested the installation of the realm), the parameters that are defined at the point of activation match the parameters that were provided along with the signature when requesting the installation of the realm, to guard against the parent realm modifying the parameters inappropriately.

As shown in FIG. 20, the realm parameters may also optionally include an epoch indication 430 which may represent a version of the software being installed for the given realm. The epoch 430 is covered by the expected signature 410 and parameter signature 422. Also the epoch 430 is included in the key material for deriving the realm secrets. This allows verification of the version of the realm software that has been installed and allows checking of which versions of realm software are allowed to derive or use secrets established by earlier or later realms/versions. Hence, if security vulnerabilities identified with a particular version of realm software having a given epoch value later updates to fix that issue can be given a later epoch value. The realm secret derivations may be such that a realm is allowed to derive or use secrets for any security epoch which is earlier or the same as its own but cannot derive secrets for any newer security epoch than its own epoch. By including the epoch in the parameters covered by the realm signature this guards against the parent realm attempting to update the epoch between being given the initial realm parameters at realm creation and the activation of the realm.

FIG. 21 is a flow diagram showing a method of verifying realm parameters based on the parameter signature. At step 440 the parent realm of the target realm to be activated issues a realm activation command specifying the target realm. At step 442 the RMU 20 checks whether the target realm is in the New state and if not then at step 444 a fault is triggered. If the realm is in the New state then at step 446 the RMU checks whether parameter signing is enabled. In some systems parameter signing may be enabled or disabled for the system as a whole. In other implementations, parameter signing may be enabled or disabled for individual realms (e.g. using a security configuration parameter of the realm descriptor which the parent realm is not allowed to update). If parameter signing is disabled then at step 448 the activation of the target realm is allowed regardless of any parameter signatures.

However, if parameter signing is enabled then at step 450 the RMU obtains the expected signature 410 of the realm parameters from the realm descriptor of the target realm. At step 452 the RMU generates the parameter signature 422 based on a subset of the actual security configuration parameters 420 defined in the realm descriptor of the target realm, and based on the measurement of realm content 421. At step 454 the RMU determines whether the parameter signature 422 matches the expected signature 410, and if so at step 456 activation is allowed and the signer ID 412 and epoch 430 are included in key material for deriving the realm secrets. If the parameter signature does not match the expected signature then at step 458 an activation restriction is applied. This could be generating a fault to prevent activation being successful, or alternatively activation could be allowed but a configuration setting may be specified to prevent that realm accessing its realm secrets.

Trusted Intermediary Realm

As shown in FIG. 22, a realm may initially be created on a particular system governed by a particular physical system. At some later point it may be terminated and then restarted on the same or a different system, or multiple instances of the same realm may be created on the same or different systems for load balancing or redundancy purposes. In either case, it may be required to share the same data set, protected by secret keys that all instances of the same realm can derive. Similarly, the security configuration parameters of the realm may need to be consistent across multiple instances of the same realm. Any binding that needs to survive a realm restart, or be possible to re-create on a different system, cannot be managed by a particular instance of a physical system on its own.

As shown in FIG. 23, a related problem is that a service provider may require the ability to migrate realms between different systems in a datacentre, or between different datacentres, to manage load, redundancy and so on across all available computing resources. In the case of a system without the realm-based protection discussed above, migration may be implemented, for example, by pausing a virtual machine, paging out the whole virtual machine, reinstating it on a different machine and then starting it again. The destination is normally not known at the start of the migration process but determined at some later point, so the migrated virtual machine can end up reinstated on any system. In some cases, the process may be started while the virtual machine is still running ("live migration"). With a system using the realm-based protections discussed above, this existing migration process does not work as it would break the fundamental security guarantee of the realm-based system. For example, a realm may have been started and attested on a system with known security properties. Since the normal migration process involves untrusted system software in the data centre, with such migration by paging it is not possible for the realm or the RMU 20 on a given physical system to enforce that the destination system has the same security properties before the Realm has been activated on the new system.

These can be addressed by defining a trusted intermediary realm which is associated with a given target realm and is allowed to manage the target realm on behalf of external party associated with that target realm. The trusted intermediary realm may for example be allowed to perform certain realm management functions including injection of "provisioned" secrets and/or saving and restoring of security configuration parameters, so that it is possible to migrate realms between different physical platforms or terminate and later reinstate instances of a realm while having a consistent set of secret keys and security configuration parameters for each instance of "the same realm".

As shown in FIG. 24, a given realm A may specify in its realm security configuration parameters 400 (i.e. in its realm descriptor 124) an identifier 500 of a trusted intermediary realm, which is another realm operating on the same physical instance. For example, the global realm identifier (GRID) as described above may be used to identify the trusted intermediary realm. In some cases, the security configuration parameters in the realm descriptor for the given realm A may also include a flag indicating whether or not the realm is associated with a trusted intermediary realm. Alternatively such a flag may be not essential in some implementations, if this can be deduced from the value in the trusted intermediary realm identifier field 500. For example if the trusted intermediary realm identifier 500 is set to a value which is not an allowed identifier for a real realm then this could implicitly identify that there is no trusted intermediary realm associated with a given realm. A realm may only be managed by one trusted intermediary realm, but one trusted intermediary realm may manage multiple other realms which each specify the same realm as the trusted intermediary realm.

The trusted intermediary realm may store within its owned memory pages 502 information for managing the associated realm A. For example, the trusted intermediary realm may store a number of provisioned secrets 504 which can be injected into realm A as key material for deriving secrets keys for protecting realm A's data and code, as well as key management policy 506 which may specify information about how those keys can be injected and when. Also, the trusted intermediary realm's owned pages 502 may store a configuration record 508 which may indicate a set of security configuration parameters which can be injected into the realm descriptor for realm A. The updating of the security configuration parameters for realm A by the trusted intermediary realm may be restricted to before activation of the realm. Some of the parameters of the realm descriptor may not be allowed to be set by the trusted intermediary realm (e.g. the identifier of the trusted intermediary realm itself).

In some examples, the security configuration record 508 may have been provided to the trusted intermediary realm at creation of the trusted intermediary realm (e.g. the security configuration record 508 of the realm A to be managed by the trusted intermediary realm may be included in the bundle of information provided to the parent realm of the trusted intermediary realm at creation of the trusted intermediary realm).

Alternatively the security configuration record could be generated as a snapshot of the configuration parameters for realm A, which is captured after activation of realm A. For example the trusted intermediary realm may be allowed to issue a command to the RMU 20 requesting that a snapshot of the security configuration parameters for realm A are returned and stored as a security configuration record in a memory region owned by the trusted intermediary realm. Such a command may be rejected by the RMU if the realm issuing the command is any realm other than the trusted intermediary realm specified in the identifier 500 within the realm security configuration parameters 400 defined for realm A. This allows the parameters of an active realm to be backed up so they can be restored later, e.g. for allowing reinstatement of a previously terminated realm as shown in FIG. 22, or for enabling migration of the realm to a different physical platform as shown in FIG. 23, or for rolling back the configuration of a given realm to an earlier state. The security configuration record 508 may be associated with migration policy 510 which may define attributes for controlling how, when and whether migration of the realm to a different platform is allowed and under what conditions.

It is not necessary for the trusted intermediary realm to support both the injection of provision secrets and the saving and restoring of the security configuration record. Some intermediary realms (or some implementations of the realm-based architecture as a whole) may be able to handle only one of these functions.

The association of a realm with a certain trusted intermediary realm at realm creation may be verified by external parties or by other realms by requesting that the RMU 20 generates an attestation of the target realm and/or an attestation of the trusted intermediary realm. Such attestations may include a signature of the security configuration parameters of the realm or the realm contents for the target realm A being managed by a trusted intermediary realm. When an attestation is generated for the realm A, the fact that realm A is associated with a trusted intermediary may be evident from the realm attestation. When attesting a target realm A, a validating entity which checks the attestation can also attest the associated trusted intermediary realm, either because a direct attestation of the intermediary realm is included in the attestation for the target realm A, or because the attestation to the target realm may specify an identifier of the trusted intermediary realm so that a separate attestation generating command can be issued to request a separate attestation of the intermediary realm.

Hence by defining a trusted intermediary realm, this allows multiple instances of a given realm to be established at different moments in time or on different physical platforms which each share access to common keys or security configuration parameters, which would be difficult to manage securely through the RMU alone or through the realm's own code.

FIG. 25 illustrates method of processing a security configuration parameter update command for updating security configuration parameters associated with a target realm. This command can be used to update the security configuration parameters associated with the target realm. At step 520 a security configuration parameter update command is received, which specifies a target realm whose parameters are to be updated.

At step 522, the RMU 20 checks whether the target realm identified by the command is currently in the Clean state. If not, then at step 524 a fault is generated as the security configuration parameters are not updateable once the realm has passed from the Clean state to the New state. If the realm is in the Clean state then at step 524 it is determined whether the realm that issued the command is the parent realm of the target realm. If so, then at step 528 the RMU allows the requested parameter update, provided the update is to a subset of the security configuration parameters which the parent realm is allowed to update. Some of the contents of the realm descriptor of a given realm, such as secret keys, may not be accessible to the parent realm of the given realm. Also, some parameters, such as whether the realm is associated with the trusted intermediary realm, the identity of the trusted intermediary realm, the expected signature 410, signer ID 412, etc. may not be allowed to be updated by the parent realm.

If the command was not issued by the parent realm then at step 530 the RMU 20 checks whether the target realm is associated with a trusted intermediary realm and whether the command was issued by the trusted intermediary realm. If either the target realm was not associated with any trusted intermediary realm or the command was not issued by the trusted intermediary realm associated with the target realm, then at step 532 a fault is triggered. Otherwise, if the command was issued by the trusted intermediary realm associated with the target realm, then at step 534 parameter updates of the realm descriptor are allowed. Again, there may be some parameters which the trusted intermediary realm is not allowed to update, but these may be fewer parameters than those which the parent realm is not allowed to update. For example, the trusted intermediary realm may not be allowed to change which realm is identified as the trusted intermediary realm. However, unlike the parent realm, the trusted intermediary realm may be allowed to update a provisioned secret which is key material for generating keys for protecting data/code associated with the realm.

The RMU may also support a command for triggering the capturing of a security configuration record 508 which represents a snapshot of a subset of a target realm's security configuration parameters. Such commands may only be accepted when issued by the trusted intermediary realm defined in the realm descriptor for the target realm.

FIG. 26 illustrates a method of processing an attestation command for triggering generation of an attestation for a target realm. At step 550 the RMU 20 receives an attestation command which identifies a target realm for which an attestation is to be generated. At step 552 it is determined whether the attestation command can be accepted, and if not then at step 554 a fault is generated. Various checks can be performed to determine whether the attestation command can be accepted. If the target realm identified by the attestation command is invalid, the attestation command can be rejected and a fault triggered. Also, if the attestation command is issued by a realm other than the trusted intermediary realm associated with the target realm, then the attestation command may be accepted if the target realm is in the Active state and rejected if the target realm is in another state. If the attestation command is issued by the trusted intermediary realm, then the attestation command may be accepted if the target realm is in any of the Clean, New or Active states.

If the attestation command is accepted, then at step 556 attestation information is generated based on the security configuration parameters of the target realm, with the attestation information providing some information which enables a validating entity to check whether the target realm meets certain properties. At step 558, the RMU 20 checks whether the target realm is associated with a trusted intermediary realm. If so, then at step 560 then RMU 20 includes information indicating that the target realm is associated with a trusted intermediary realm in the attestation information, and also includes intermediary realm attestation information which either identifies the trusted intermediary realm or provides attestation information attesting to properties of the intermediary realm. If the target realm did not have an associated trusted intermediary realm then step 560 is omitted. Either way, at step 562 the attestation information is signed with a key which attests to the attestation's validity, and the attestation is output to the party that requested it.

Hence, when the target realm is associated with a trusted intermediary realm, the validating party can use the attestation to check whether the trusted intermediary realm has certain properties, either by checking the attestation of the target realm itself or by using the identifier included in the target realm's attestation to request a further attestation of the trusted intermediary realm. In this way the trust can be ensured to the fact that the target realm was correctly configured by an appropriately behaving trusted intermediary realm.

Hence, in summary, a trusted intermediary is defined for managing a given realm, which is itself a realm associated with the same realm managing party (e.g. the same banking provider, healthcare provider etc.) as the given realm to be managed, with special properties allowing it to manage other realms on behalf of that party. In the simplest implementation, one instance of the trusted intermediary (per realm managing party) may be present on each system where the realms may exist. Since the trusted intermediary is itself a realm, it can be attested by the realm managing party as part of commissioning, ensuring that the trusted intermediary can only be active/commissioned on systems with required security properties.

Hence, a realm can be associated with a trusted intermediary at realm creation such that: only the identified trusted intermediary can manage the realm; the fact the realm is associated with a trusted intermediary is evident from the realm attestation; and when attesting the realm, a validating entity can also attest the associated trusted intermediary. The trusted intermediary may receive the security context of a realm from a given physical instance of the apparatus 2, and reinstate the security context of the realm on the same instance or a different instance. The migration policy for the realm owner is encoded within the trusted intermediary associated with the realm owner. The policy can itself be attested by attesting the trusted intermediary. This includes policy for how and when realm security contexts are transferred between different systems. As a secondary use, the same method can support related use cases such as backup/restore of a complete realm, or taking snapshots/checkpoints of a realm allowing it to be rolled back to a previous known state, and so on.

A trusted intermediary can attest a managed realm before the realm is activated. A trusted intermediary is allowed to inject provisioned root secrets during realm creation, before the realm is activated. The key management policy for the realm owner is encoded within the trusted intermediary associated with the realm owner. The policy can itself be attested by attesting the trusted intermediary. This includes provisioning the same root secrets following restart of a realm, or to multiple instances of the same realm, or independently of which system a Realm happens to be started on, and so on.

FIG. 27 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry (such as the MMU 26 and RMU 20) may be implemented in a simulated embodiment as computer program logic (e.g. memory access program logic and realm management program logic) within the simulator program 710. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include the applications, operating systems and hypervisor as shown in FIG. 2) which is the same as the application program interface of the hardware architecture being modelled by the simulator program 710. Thus, the program instructions of the target code 700, including the control of memory accesses based on the realm protection functionality described above, may be executed from within the instruction execution environment using the simulator program 710, so that a host computer 730 which does not actually have the hardware features of the apparatus 2 discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry configured to perform data processing in response to one or more software processes; and
memory access circuitry configured to control access to a plurality of memory regions based on ownership information defining, for a given memory region, an owner realm specified from among a plurality of realms, each realm corresponding to at least a portion of at least one of the software processes, said owner realm having a right to exclude other realms from accessing data stored within said given memory region; and realm management circuitry configured to control operation of a given realm based on security configuration parameters associated with the given realm; wherein:

in response to the security configuration parameters for the given realm specifying that the given realm is associated with a trusted intermediary realm identified by the security configuration parameters, the realm management circuitry is configured to permit the trusted intermediary realm to perform at least one realm management function for the given realm;

each realm other than a root realm is associated with a corresponding parent realm which created the realm; and the realm management circuitry is configured to support the security configuration parameters defining the trusted intermediary realm as a realm other than the parent realm of the given realm.

2. The apparatus according to claim 1, in which the realm management function comprises updating at least a portion of the security configuration parameters for the given realm.

3. The apparatus according to claim 1, in which the realm management circuitry is configured to set whether the given realm is associated with the trusted intermediary realm, based on at least one command issued by the parent realm during creation of the given realm.

4. The apparatus according to claim 1, in which the realm management circuitry is configured, in response to an attestation command identifying a target realm, to provide an attestation attesting to properties of the target realm.

5. The apparatus according to claim 4, in which in response to the security configuration parameters for the given realm specifying that the target realm is associated with the trusted intermediary realm, the realm management circuitry is configured to provide the attestation comprising information indicating that the target realm is associated with the trusted intermediary realm.

6. The apparatus according to claim 4, in which in response to the security configuration parameters for the target realm specifying that the target realm is associated with the trusted intermediary realm, the realm management circuitry is configured to provide the attestation for the target realm specifying intermediary realm attestation information, the intermediary realm attestation information attesting to properties of the trusted intermediary realm or providing information for enabling a recipient of the attestation to request an attestation for the trusted intermediary realm associated with the target realm.

7. The apparatus according to claim 4, in which the realm management circuitry is configured to prevent the processing circuitry from processing a given realm until the given realm has been activated; and the realm management circuitry is configured to permit the trusted intermediary realm associated with the given realm to trigger generation of an attestation for the given realm before the given realm has been activated.

8. The apparatus according to claim 1, in which the realm management circuitry is configured to permit the trusted intermediary realm to provide at least one provisioned secret for the given realm, said provisioned secret comprising at least one of:

at least one secret key for protecting data associated with the given realm; and key material for deriving said at least one secret key.

9. The apparatus according to claim 8, in which the realm management circuitry is configured to prohibit a realm other than the trusted intermediary realm from providing said at least one provisioned secret for the given realm.

10. The apparatus according to claim 8, in which the realm management circuitry is configured to prevent the processing circuitry from processing a given realm until the given realm has been activated;

the realm management circuitry is configured to permit the trusted intermediary realm to provide the at least one provisioned secret for the given realm before the given realm has been activated; and the realm management circuitry is configured to prevent the trusted intermediary realm providing the at least one provisioned secret for the given realm after the given realm has been activated.

11. The apparatus according to claim 8, in which the realm management circuitry is configured to manage provision of the at least one provisioned secret based on key management policy information provided by the trusted intermediary realm.

12. The apparatus according to claim 1, in which the realm management circuitry is configured to permit the trusted intermediary realm to record a security configuration record indicative of at least a subset of the security configuration parameters associated with the given realm.

13. The apparatus according to claim 12, in which the realm management circuitry is configured to manage recording of the security configuration record or restoration of security configuration parameters from the security configuration record, based on policy information provided by the trusted intermediary realm.

14. The apparatus according to claim 1, in which the realm management circuitry is configured to permit the trusted intermediary realm to update at least a subset of the security configuration parameters associated with the given realm based on a security configuration record previously recorded by the trusted intermediary realm.

15. The apparatus according to claim 1, in which the security configuration parameters for the given realm include at least one of:

a realm type;

a protected address range associated with the given realm;

an indication of whether debugging is enabled within the given realm;

an indication of whether export of data from a first memory, which is subject to access control by the memory access circuitry, to a second memory is permitted; and key material for derivation of at least one secret key for protecting data associated with the given realm.

16. The apparatus according to claim 1, in which the owner realm has a right to prevent access to the given memory region by a process executed at a greater privilege level than the owner realm.

17. A data processing method comprising:

performing data processing in response to one or more software processes; and enforcing ownership rights for a plurality of memory regions based on ownership information defining, for a given memory region, an owner realm specified from among a plurality of realms, each realm corresponding to at least a portion of at least one of the software processes, said owner realm having a right to exclude other realms from accessing data stored within said given memory region; and controlling operation of a given realm based on security configuration parameters associated with the given realm; in which:

in response to the security configuration parameters for the given realm specifying that the given realm is associated with a trusted intermediary realm identified by the security configuration parameters, the trusted intermediary realm is permitted to perform at least one realm management function for the given realm;

each realm other than a root realm is associated with a corresponding parent realm which created the realm; and the security configuration parameters support defining the trusted intermediary realm as a realm other than the parent realm of the given realm.

18. A non-transitory, computer-readable storage medium storing a computer program for controlling a host data processing apparatus to provide an instruction execution environment, comprising:

memory access program logic configured to control access to a plurality of memory regions of a simulated memory address space based on ownership information defining, for a given memory region, an owner realm specified from among a plurality of realms, each realm corresponding to at least a portion of at least one of a plurality of software processes executed in the instruction execution environment, said owner realm having a right to exclude other realms from accessing data stored within said given memory region; and realm management program logic configured to control operation of a given realm based on security configuration parameters associated with the given realm; in which:

in response to the security configuration parameters for the given realm specifying that the given realm is associated with a trusted intermediary realm identified by the security configuration parameters, the realm management program logic is configured to permit the trusted intermediary realm to perform at least one realm management function for the given realm;

each realm other than a root realm is associated with a corresponding parent realm which created the realm; and the security configuration parameters support defining the trusted intermediary realm as a realm other than the parent realm of the given realm.

* * * * *